United States Patent
Nayar et al.

(10) Patent No.: US 11,829,332 B1
(45) Date of Patent: Nov. 28, 2023

(54) CONTENT IMPORTING WITH DISCOVERY IN A COLLABORATIVE ENVIRONMENT

(71) Applicant: Amazon Technologies, Inc., Seattle, WA (US)

(72) Inventors: Manoj Nayar, Redmond, WA (US); Demian Gutierrez, Bothell, WA (US); Durgesh Nandan, Sammamish, WA (US); Raghuram Setra Venkateswara, Hospet (IN)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 17/360,894

(22) Filed: Jun. 28, 2021

(51) Int. Cl.
*G06F 16/176* (2019.01)
*G06F 16/93* (2019.01)
*G06N 20/00* (2019.01)
*G06F 16/178* (2019.01)
*G06F 16/383* (2019.01)
*G06F 21/62* (2013.01)
*G06F 16/332* (2019.01)

(52) U.S. Cl.
CPC .......... *G06F 16/176* (2019.01); *G06F 16/178* (2019.01); *G06F 16/3326* (2019.01); *G06F 16/383* (2019.01); *G06F 16/93* (2019.01); *G06F 21/6218* (2013.01); *G06N 20/00* (2019.01)

(58) Field of Classification Search
CPC .... G06F 16/176; G06F 16/93; G06F 16/3326; G06F 16/178; G06F 16/383; G06F 21/6218; G06N 20/00

USPC ........................................................ 707/822
See application file for complete search history.

(56) References Cited

U.S. PATENT DOCUMENTS

| | | | |
|---|---|---|---|
| 7,590,616 | B2 | 9/2009 | Guan et al. |
| 8,943,070 | B2 | 1/2015 | Jin et al. |
| 10,534,825 | B2 | 1/2020 | Mukherjee et al. |
| 10,635,721 | B2 * | 4/2020 | Chen ...................... G06F 16/93 |
| 10,671,679 | B2 * | 6/2020 | Wang ................. G06F 16/9535 |
| 10,673,964 | B2 | 6/2020 | Lewis et al. |

(Continued)

OTHER PUBLICATIONS

U.S. Appl. No. 17/119,906, filed Dec. 11, 2020, Manoj Nayar et al.

(Continued)

*Primary Examiner* — Hosain T Alam
*Assistant Examiner* — Saba Ahmed
(74) *Attorney, Agent, or Firm* — Robert C. Kowert; Kowert, Hood, Munyon, Rankin & Goetzel, P.C.

(57) ABSTRACT

Methods, systems, and computer-readable media for content importing with discovery in a collaborative environment are disclosed. A content sharing system retrieves a document from a data source using a connector associated with the data source. The document is retrieved using one or more credentials associated with a user. The content sharing system retrieves metadata associated with a plurality of additional documents stored by the data source. The metadata is retrieved using the one or more credentials associated with the user. The content sharing system determines, based at least in part on the metadata associated with the plurality of additional documents, one or more of the additional documents that are anticipated to be relevant to the user. Data descriptive of the one or more of the additional documents is presented to the user via a user interface.

20 Claims, 11 Drawing Sheets

(56) References Cited

U.S. PATENT DOCUMENTS

| | | | |
|---|---|---|---|
| 10,776,432 B2* | 9/2020 | Volach | G06Q 30/0269 |
| 10,785,538 B2 | 9/2020 | Potluru et al. | |
| 10,810,616 B2* | 10/2020 | Modarresi | G06F 16/9035 |
| 10,834,448 B2* | 11/2020 | Louboutin | H04N 21/4668 |
| 10,834,453 B2 | 11/2020 | Tillette de Clermont-Tonnerre et al. | |
| 10,848,590 B2 | 11/2020 | Raichelgauz et al. | |
| 2018/0046682 A1* | 2/2018 | Rinearson | G06Q 30/02 |
| 2018/0189830 A1* | 7/2018 | Lenhart | G06Q 30/0255 |
| 2019/0141398 A1* | 5/2019 | Auxer | H04N 21/472 |
| 2022/0261445 A1* | 8/2022 | Gentilcore | G06F 16/90344 |

OTHER PUBLICATIONS

Jiri Kuncar, et al, "Invenio v2.0: A Pythonic Framework for Large-Scale Digital Libraries", Open Repositories 2014, p. 1-4.

* cited by examiner

Personalized User Interface 160

Team Name 410

Actions 420

| Upload File 421 | Create Task 422 | Add User 423 | Create Topic 424 | Create Group 425 | New Post 426 | ... |

What's Happening Today 430

| Meeting Today 431 | Document Awaiting Feedback 432 | Chat Replies 433 | New Document Uploaded 434 | Event Invite 435 | ... |

Tasks Due Soon 440

| Complete Document Revision by 1 PM Today 441 | Schedule Calls by 10 AM Tomorrow 442 | Respond to Feedback Request by Friday 443 | ... |

Recent Posts 450

| Post by Team Member 451 | Post by Team Member 452 | Post by Team Member 453 | ... |

FIG. 4

CONTENT IMPORTING WITH DISCOVERY IN A COLLABORATIVE ENVIRONMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. As the scale and scope of distributed systems have increased, the tasks of provisioning, administering, and managing system resources have become increasingly complicated. For example, the costs to manage distributed resources can increase with the complexity and scale of the resources.

BRIEF DESCRIPTION OF THE DRAWINGS

FIG. 4 illustrates an example of a personalized user interface usable for personalized content discovery in a collaborative environment, according to some embodiments.

Figure 1:
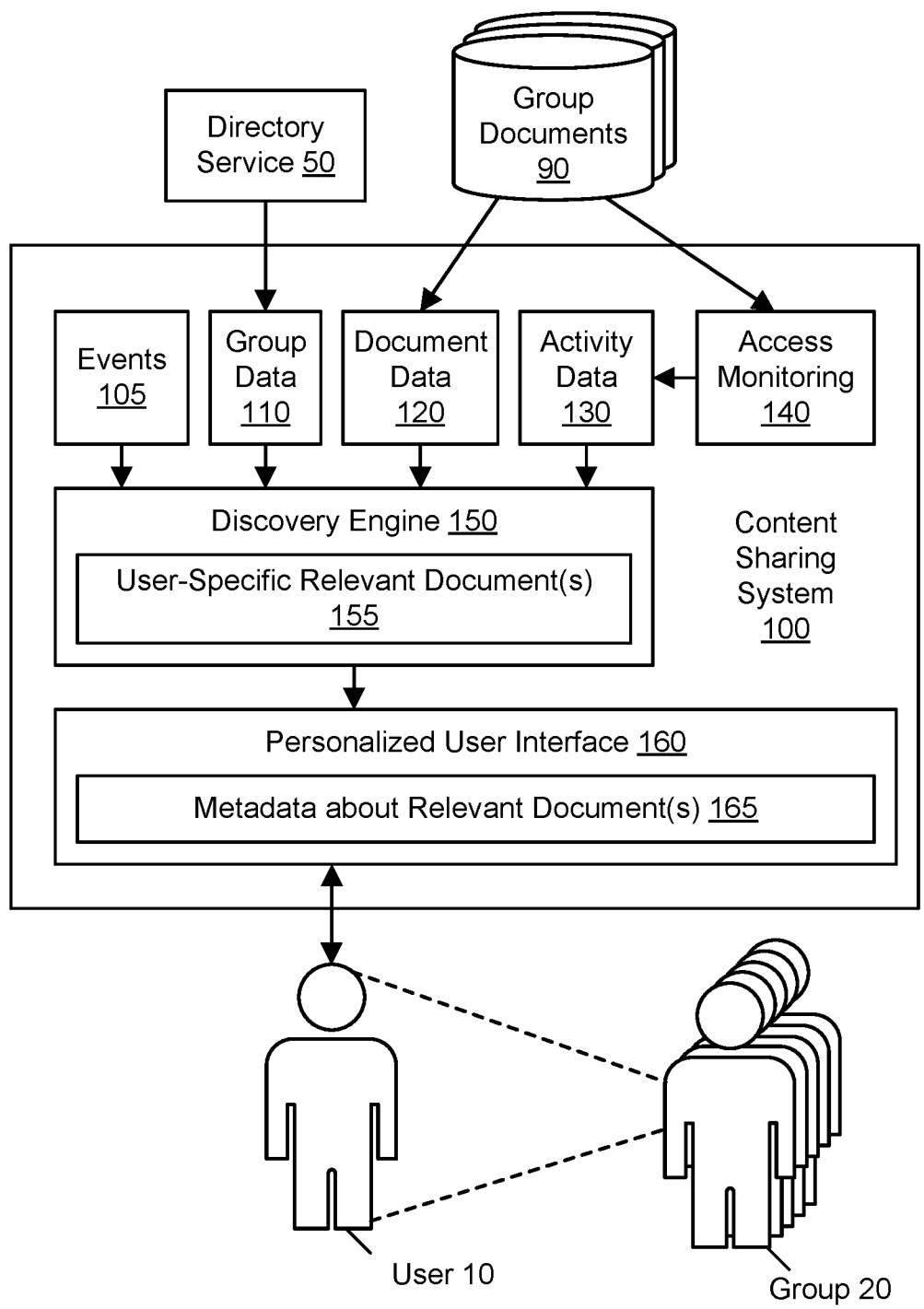
FIG. 1 illustrates an example system environment for personalized content discovery in a collaborative environment, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for content importing with discovery in a collaborative environment are described. Many organizations provide collaborative enterprise environments in which various groups of users (e.g., information workers) work together towards shared goals via the use of computer systems. To accomplish such goals, individual users may perform individual tasks. For example, individual tasks may involve reading documents, editing documents, attending meetings, responding to requests from other users in a group, and so on. The amount and complexity of information that is available to a typical user is continuing to grow. Users in collaborative environments may sometimes find it difficult to know what documents they should focus on for a given day, what tasks they should perform next, and so on.

Even if the documents or their characteristics are known, the process of manually finding the particular documents may be time-consuming and error-prone. For example, if a user searches a document repository for any documents edited by a particular co-worker, the search results may include thousands of such documents. Prior approaches have often used a myriad of different applications (e.g., e-mail, chat, project management tools, and so on) rather than a unified interface for coordinating team activities. Coordinating team activities using such a disparate set of tools may also be time-consuming and error-prone. Additionally, documents to be imported into the collaborative environment may be stored using a variety of external storage solutions, repositories, or other data sources. These data sources may differ in terms of how they store documents and the interfaces by which documents are accessed. Cross-system file migrations from these data sources into the collaborative environment may be complex and time-consuming to perform correctly.

The aforementioned challenges, among others, are addressed by embodiments of the techniques described herein, whereby a content sharing system may provide, for particular users, importing of documents from federated data sources along with intelligent and personalized recommendations for related documents. Some documents may be identified by users for importing. To facilitate moving or copying these individual documents into the collaborative environment, a content sharing system may use domain-specific connectors that implement the techniques and data needed to retrieve documents from a particular data source using a user's credentials. The connectors may also retrieve metadata (e.g., activity data such as the creation date or last editor ID, sharing data, permissions, user schedules, tags, labels, etc.) associated with other documents that have not necessarily been imported. Using that metadata, a discovery engine may apply one or more machine learning models or rule processors to determine additional documents to be imported, recommended to the user, shared with team members, and so on. For example, the discovery engine may calculate relevance scores for individual documents, e.g., based (at least in part) on document ownership, document activity, document sharing, and other metadata. Based (at least in part) on the output of the machine learning model(s), the system may retrieve additional metadata from a data source for refinement of the model output. By using the domain-specific connectors for document discovery, the content sharing system may recommend relevant documents to users without the users needing to know the identities or locations of the documents, thereby driving additional use of the content sharing system.

The content sharing system may use automated techniques to identify documents (such as files, action items, meeting invites, and so on) that are relevant to a particular user. The content sharing system may then present the documents to the user as recommendations or suggestions that are usable for discovery. For example, the content sharing system may predict documents that the user is anticipated to access for a particular day. The predictions may be generated for a particular user for a particular period of time (e.g., the current day or week) and may change over time. Personalized recommendations may become richer over time as the recommendations are refined based on a deeper understanding by the content sharing system of user and team activities. In some embodiments, recommendations may be refined based (at least in part) on user approval or disapproval of recommendations. The content sharing system may select relevant documents based (at least in part) on group data and/or metadata such as group hierarchy information, employee roles, employee departments, security group membership, employee relationships with co-workers, user-specific content interests, and so on. The content sharing system may select relevant documents based (at least in part) on activity data and/or metadata measuring interactions and engagement with the group's documents such as recently accessed documents, recently linked documents, recently uploaded documents, recently updated documents, frequently accessed documents, mentions of users in group posts or comments, collaboration history between users, "likes" and "dislikes" provided by users, and so on. The content sharing system may select relevant documents based (at least in part) on events and schedules, e.g., recurring meetings or other recurring events.

After determining a set of documents that are relevant to a particular user, the content sharing system may present metadata (e.g., titles, content previews, thumbnail images, document ownership information, document activity information, document sharing information, and/or other descriptive information) about the documents in a user interface to enable discovery by the user. The user may view the descriptions of documents in the user interface and may potentially access selected documents via the interface. Via the user interface, team-related content from different repositories and/or applications may be shared in a single location for members of the team. The user interface may represent a custom landing page for users. The user interface may present files being collaborated upon, team members with whom to connect, team activities in which to participate, and so on. The user interface may be compliant with security policies and regulatory policies. Using customized content discovery for a particular group context, the content sharing system may facilitate easier and faster collaboration among users in the group such that shared goals are completed more rapidly.

As one skilled in the art will appreciate in light of this disclosure, embodiments may be capable of achieving certain technical advantages, including some or all of the following: (1) reducing the latency of document access via computer systems by predicting relevant documents that a user is expected to access without requiring the user to identify the documents; (2) reducing the latency of document access via computer systems by permitting users to access relevant documents via a user interface without requiring the user to locate the documents; (3) improving the speed of task performance via computer systems by generating action items for particular users in a group according to automated analysis of group activity; (4) improving the security of computer systems by providing access to shared documents via a secure interface; (5) improving the use of network resources by importing to a content sharing system only those documents specifically identified by users or deemed relevant based on analysis of document metadata; and so on.

Personalized Content Discovery in a Collaborative Environment

FIG. 1 illustrates an example system environment for personalized content discovery in a collaborative environment, according to some embodiments. A content sharing system 100 may perform content management in an enterprise environment. The enterprise environment may include numerous users (e.g., information workers, managers, and so on) who may be divided among different groups or teams. A particular user 10 may be part of one or more groups such as group 20 and/or other groups. The enterprise environment may foster collaboration such that various groups of users work together towards shared goals via the use of computer systems. To accomplish such goals, individual users may perform individual tasks such as reading documents, editing documents, attending meetings, responding to requests from other users in a group, and so on. The enterprise environment may include a large volume of content that users may need to access in order to perform tasks. The content may include individual elements of content or units of content such as documents, files, or data structures expressed in various formats, e.g., proprietary formats used by particular applications or standardized formats used by many applications. For example, documents 90 and other content used in the enterprise environment may include word processing files, text files, spreadsheets, PDF documents, XML, documents, images, audio, video, meeting invites, action items, and so on.

The content sharing system 100 may facilitate easier access to such content by providing, for particular users in a group, intelligent and personalized content discovery for the documents 90 (including files as well as meeting invites, action items, and so on) that are expected to be most relevant and/or most likely to be accessed, used, or acted upon for a given time period. The content sharing system 100 may provide access to content without requiring users to manually search for specific documents. The content sharing system 100 may provide access to content without requiring users to know where documents 90 are located. The content sharing system 100 may provide access to content from a variety of repositories or storage locations using a personalized user interface 160. The storage locations may include a user's own storage as well as group storage and/or other users' storage. The content sharing system 100 may provide access to content in a variety of formats using the personalized user interface 160. Using customized content discovery for particular users in a particular group context, the content sharing system 100 may facilitate easier and faster collaboration among users in the group such that shared goals are completed more rapidly.

Using a discovery engine 150, the content sharing system 100 may use automated techniques to identify or predict documents 155 (such as files, action items, meeting invites, and so on) that are relevant to a particular user in a group. The recommended documents 155 may be selected from a set of candidate documents 90 to which the group has access. To reflect users' real-world focus on a small number of discrete tasks at any one time, the set of recommended documents 155 may be much smaller than the set of candidate documents 90. The predictions may be generated for a particular user 10 for a particular period of time (e.g., the current day or week) and may change over time. In some embodiments, recommendations may change due to observed patterns for document importance at particular times of the week, for different times of the year, and so on. The content sharing system 100 may predict documents 155 (or other units of content) that the user 10 is anticipated to access for a particular time period and/or that have the most relevance to the user for the particular time period. For example, if a user 10 is a new addition to a group 20, then the content sharing system 100 may select a set of onboarding documents that have been identified by a team leader for new members to read. As another example, if a user 10 has been invited to a meeting, then the content sharing system 100 may select one or more documents 155 that are being viewed by other users invited to the meeting.

The content sharing system 100 may select relevant documents 155 based (at least in part) on group data and/or metadata 110. Group data and/or metadata 110 may include group hierarchy information that indicates the relationships of individuals or teams with other individuals or teams, e.g., with supervisory relationships or other hierarchical relationships. In some embodiments, the group data and/or metadata 110 may be used to generate a graph of user relationships, including hierarchical relationships. Group data and/or metadata 110 may include employee roles and/or employee departments. For example, the system 100 may recommend a document for a member of a team after observing that many other members of the same team have viewed the document recently. Group data and/or metadata 110 may include security group membership. Group data and/or metadata 110 may include employee relationships with co-workers. Group data and/or metadata 110 may include user-specific content interests. For example, the system 100 may recommend a document for a user in response to observing that a document has been tagged with a particular label which is of interest to the user. In some embodiments, the group data and/or metadata 110 may be derived from a directory service 50, e.g., a service implemented according to Lightweight Directory Access Protocol (LDAP). The directory service 50 may maintain information about user identities, user relationships, and user metadata usable to manage permissions and access to network resources.

The content sharing system 100 may select relevant documents 155 based (at least in part) on document contents and/or metadata 120 for a set of documents 90 accessible to a particular group 20. The set of documents 90 may represent candidate documents for a discovery engine 150. Document contents and/or metadata 120 may include document titles, document tags, document classifications, document version changes, document ownership, document access privileges, keyword matches to user or team activities, and so on. In various embodiments, the document data and/or metadata 120 may include usage or engagement data 130, or the activity data 130 may be independent of the document data 120.

The activity data 130 may measure interactions and engagement by the group with respect to the group's content. For example, the activity data 130 may indicate recently accessed documents, recently linked documents, recently uploaded documents, recently updated documents, and/or frequently accessed documents. In some embodiments, a greater frequency of activity (e.g., viewing, editing, adding, downloading, sharing, or commenting) for a document within a team may tend to be linked to greater relevance or importance and thus a greater chance of the document being recommended to team members. In some embodiments, a greater recency of activity (e.g., viewing, editing, adding, downloading, sharing, or commenting) for a document within a team may tend to be linked to greater relevance or importance and thus a greater chance of the document being recommended to team members.

The activity data 130 may be generated using a component for document access monitoring 140 that tracks users' interactions and engagement with the set of documents 90 and content to which the group has access. The access monitoring 140 may monitor various actions such as opening files, downloading files, viewing content, sharing documents, commenting within a document, posting a comment, and so on. In some embodiments, the set of monitored actions may grow over time to provide a richer discovery experience for users. The document contents and/or metadata 120 or activity data 130 may include mentions of users in group posts or comments. The document contents and/or metadata 120 or activity data 130 may include any collaboration history between users, e.g., where two or more users that have both edited the same document(s) may have a collaboration history. The document contents and/or metadata 120 or activity data 130 may include users' reactions such as approval ("likes") and disapproval ("dislikes") provided for individual documents, team posts, comments, and so on. The set of recommended documents 155 may be refined based (at least in part) on such responses, e.g., to remove documents for which the user expressed disapproval.

The content sharing system 100 may select relevant documents 155 based (at least in part) on events 105. In some embodiments, the events 105 may represent calendar events such as meetings. In some embodiments, the events 105 may represent events that recur on a predictable schedule. For example, if the system 100 determines that a meeting with a particular title and the same (or similar) set of invitees occurs weekly at the same day and at the same time, the system may create a recurring event for the meeting. The recurring event may be used to make content recommendations for users invited to the meeting. The events 105 may also be used to capture seasonality of document-related activities. For example, some documents may be used (e.g., read, edited, shared, and so on) more frequently at the first of the month or at certain times of the year, and such usage patterns may drive the personalized recommendation of documents by the discovery engine 150. In some embodiments, at least some of the events 105 may be determined using the access monitoring 140. In some embodiments, events 105 may serve as triggers for evaluation of rules by a rules engine.

The content sharing system 100 may identify relevant documents 155 based (at least in part) on guidance from team leaders. A user in a particular group 20, such as a team leader or supervisor or other user with sufficient privileges, may provide direct indications or indirect "hints" that particular documents should be recommended under particular circumstances. For example, a team leader may identify a set of onboarding documents for new members to read. If a particular user 10 is a new addition to a group 20, then the content sharing system 100 may recommend the set of onboarding documents for the particular user. As another example, a user who sets up a meeting may provide user input that indicates a set of documents relevant to that meeting, and those documents may be recommended for users who are invited to the meeting.

In some embodiments, the content sharing system 100 itself may generate action items that can be recommended for particular users. Action items may represent "to-do" items or other indications of tasks that individual users are expected to perform. The content sharing system 100 may generate action items based (at least in part) on user interactions with documents or other activity data. The document access monitoring component may track "mentions" of user identities in posts or comments by other users. For example, if the document access monitoring determines that a first user has included the name of a second user in a comment (e.g., "@second-user"), and the comment has asked for input on a document, then the content sharing system 100 may generate an action item indicating that the second user should provide a response to the first user with respect to the particular document. The action item may include a description of the expected action, e.g., as derived from text of the mention. The action item may include a deadline if a date or time was included in the comment from which the action item is derived. This automatically generated action item may be recommended to the second user. In some embodiments, using similar techniques, the content sharing system 100 itself may generate meeting invites that can be recommended for particular users. In some embodiments, the content sharing system 100 may surface just-in-time actions that may be triggered by user activities or events. For example, the system 100 may present a recommended item seeking approval or disapproval of a particular document by the user 10. As another example, the system 100 may present a recommended item asking the user 10 to share a document with an appropriate set of recipients.

To select documents 155 for a particular user 10, the content sharing system 100 may use one or more machine learning and/or automated reasoning models. In some embodiments, the discovery engine 150 may include a rule processor or rules engine that applies rules to a set of candidate documents in order to determine document relevance for a particular user and a particular context (e.g., group membership, time period, and so on). The rule processor may implement automated reasoning techniques such that particular actions are taken if particular inputs are encountered. A particular rule may include one or more inputs, one or more actions to be taken in response to the input(s), and potentially other reasoning about actions to be taken. The inputs that drive the automated reasoning may be part of group data 110, document contents and metadata 120, activity data 130, and so on. For example, the rule processor may determine that a meeting invite is relevant for a user's day if the meeting is scheduled for later that day. As another example, the rule processor may determine that a particular document is relevant to a user (e.g., likely to be accessed or used by the user) if a sufficient number of other team members (e.g., a number at or beyond some threshold percentage of the team) have been accessing the document in the past day. As yet another example, the rule processor may determine that a particular action item is relevant to a user if the action item is newly created or has an imminent deadline. Using such models, personalized recommendations may become richer over time as the recommendations are refined based on a deeper understanding by the content sharing system 100 of user and team activities. In some embodiments, the automated reasoning model(s) may detect and alert upon anomalous behavior by users in terms of sharing documents, downloading documents, viewing documents, editing documents, and so on.

The content sharing system 100 may present the selected documents 155 to the user as recommendations or suggestions. The recommendations may be presented to the user via a personalized user interface 160 that implements a graphical user interface (GUI), command-line interface (CLI), and/or voice-activated interface. In some embodiments, recommendations may be generated by the content sharing system 100 and provided to one or more external front-end systems with which the user may interact, e.g., by using one or more application programming interfaces (APIs) or other programmatic interfaces to send the document metadata from the content sharing system 100 to the one or more external systems. Via the user interface 160, related content from different repositories and/or applications may be shared in a single location for members of the team. The user interface 160 may represent a customized landing page for users such that content (e.g., recommended documents 155) presented via the user interface may vary from user to user. The user interface 160 may present files being collaborated upon, team members with whom to connect, team activities in which to participate, and so on. The user interface 160 may be compliant with security policies and regulatory policies.

After determining a set of documents 155 that are anticipated to be relevant to a particular user 10, the content sharing system 100 may present metadata 165 about the documents in the user interface 160. For example, document metadata 165 may include document titles, document ownership, document creation history (e.g., the identity of the creator and/or the date at which the document was created), document editing history (e.g., the identity of the last editor and/or the date at which the document was last edited), content previews, thumbnail images, and/or other descriptive information. The user 10 may view the descriptions of recommended documents in the user interface 160. In some embodiments, the user 10 may view the metadata 165 and potentially access selected documents via the interface 160 without needing to know document names or document locations.

In some embodiments, the set of recommended documents 155 may be generated or updated at appropriate points in time, and the presentation via the user interface 160 may be updated accordingly. For example, the set of recommended documents 155 for a particular user 10 may be generated or updated every day at a particular time. As another example, the set of recommended documents 155 may be generated or updated after the user 10 has accessed or used one or more of the documents or after an item has expired, e.g., by marking an action item as completed or upon conclusion of a meeting. As a further example, the set of recommended documents 155 may be generated or updated in real-time or near-real-time when the user 10 accesses the user interface 160. As yet another example, the set of recommended documents 155 may be generated or updated in response to updates to the group data 110, such as when a user 10 joins a new group or when a user's role changes. As yet another example, the set of recommended documents 155 may be generated or updated in response to updates to the document data 120 and/or activity data 130, e.g., such that one or more rules are triggered using a rule processor. As a further example, the set of recommended documents 155 may be generated or updated in response to events 105.

In one embodiment, one or more components of the content sharing system 100 may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture, e.g., to provide the functionality and resources of the content sharing system 100. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the content sharing system 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network. In one embodiment, portions of the functionality of the provider network, such as the content sharing system 100, may be offered to clients in exchange for fees.

Figure 11:
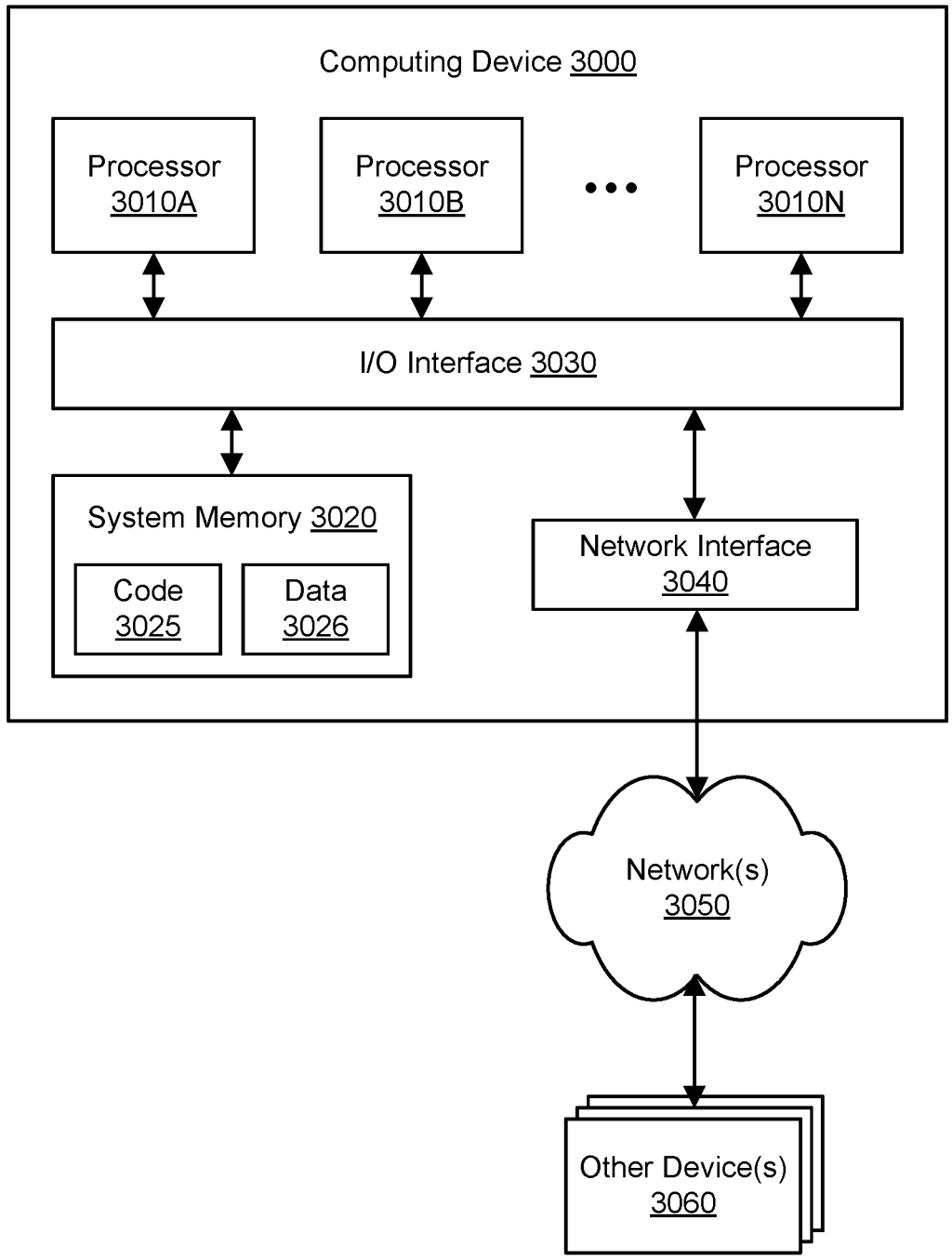
FIG. 11 illustrates an example computing device that may be used in some embodiments.

In various embodiments, components of the content sharing system 100 may be implemented using any suitable number and configuration of computing devices, any of which may be implemented by the example computing device 3000 illustrated in FIG. 11. In some embodiments, the computing devices may be located in any suitable number of data centers or geographical locations. In various embodiments, at least some of the functionality of the content sharing system 100 may be provided by the same computing device or by different computing devices. In various embodiments, if any of the components of the content sharing system 100 are implemented using different computing devices, then the components and their respective computing devices may be communicatively coupled, e.g., via one or more networks. Any of the components of the content sharing system 100 may represent any combination of software and hardware usable to perform their respective functions. In some embodiments, operations implemented by the content sharing system 100 may be performed automatically, e.g., without a need for user initiation or user intervention after an initial configuration stage, and/or programmatically, e.g., by execution of program instructions on at least one computing device. In some embodiments, the content sharing system 100 may include additional components not shown, fewer components than shown, or different combinations, configurations, or quantities of the components shown.

Figure 2:
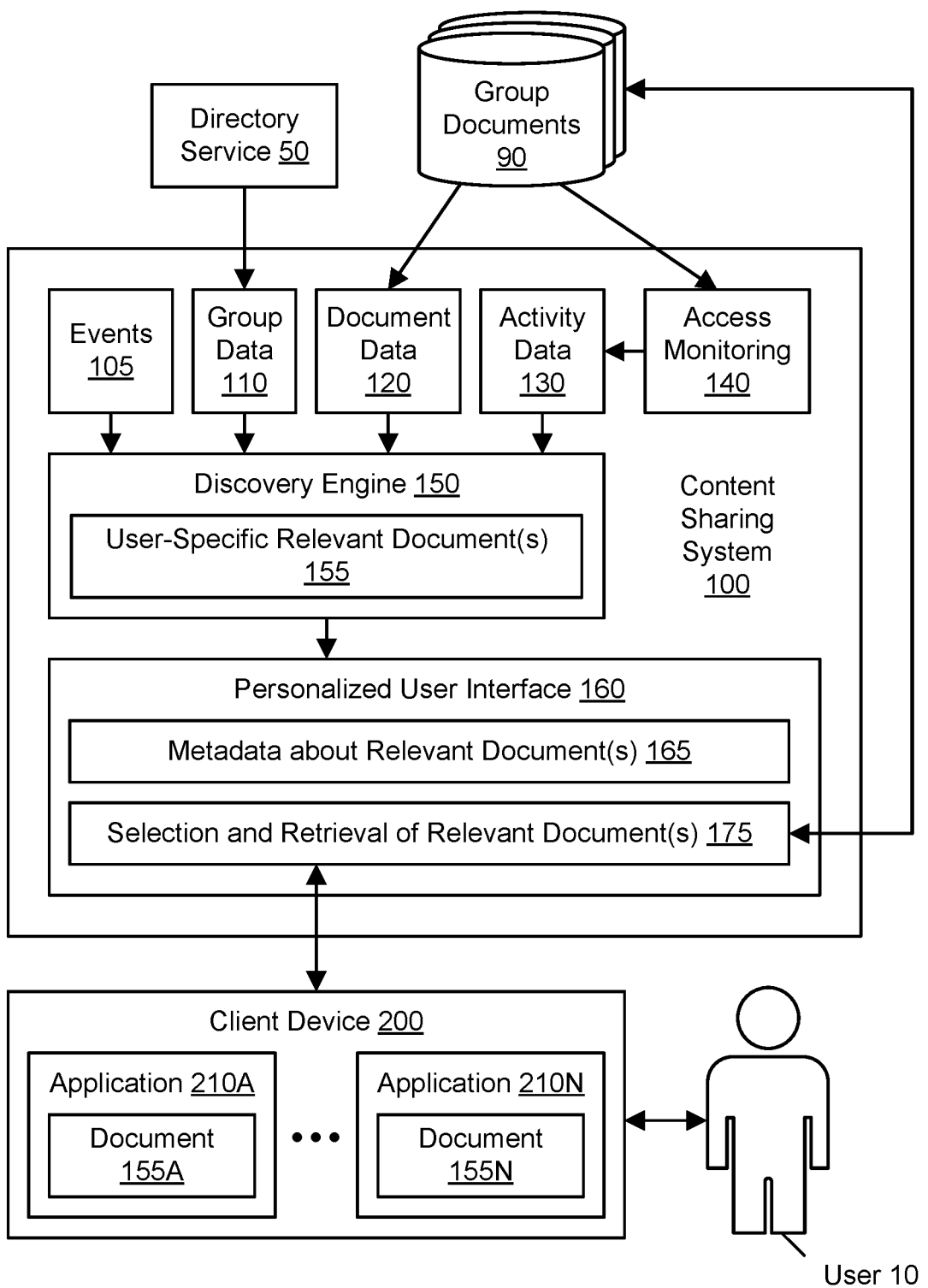
FIG. 2 illustrates further aspects of the example system environment for personalized content discovery in a collaborative environment, including selection of recommended documents via a personalized user interface and retrieval of the selected documents for use by a user, according to some embodiments.

FIG. 2 illustrates further aspects of the example system environment for personalized content discovery in a collaborative environment, including selection of recommended documents via a personalized user interface and retrieval of the selected documents for use by a user, according to some embodiments. As discussed above, the user 10 may view the descriptions 165 of recommended documents in the user interface 160. The user interface 160 may include a component for selection and retrieval 175 of relevant documents. Using the component for selection and retrieval 175, the user 10 may select one or more of the recommended documents 155, e.g., by clicking on corresponding elements of the metadata 165 such as document titles, preview images, and so on. The system 100 may then securely retrieve the selected document(s) from one or more document repositories 90. The system 100 may cause the retrieved document(s) to be sent to a client device 200 operated by the user 10.

The client device 200 may include one or more applications that are configured to open various formats of the documents 90. As shown in the example of FIG. 2, the client device 200 may include one application 210A configured to open document 155A of a first file type, and the client device 200 may also include another application 210N configured to open document 155N of a second file type. The applications 210A-210N may permit viewing, downloading, editing, commenting, approving, and other appropriate actions for various ones of the documents 155. In some embodiments, the user 10 may access documents 155 via the interface 160 without needing to know document names or document locations. For example, if the user 10 is presented a set of five recommended files, the user may click on the first file, and the content sharing system 100 may launch (or cause to be launched) an appropriate application which may open the first file for the user and/or enable actions such as viewing, downloading, editing, commenting, approving, and so on.

In some embodiments, a client device 200 usable with the content sharing system 100 may represent one or more external devices, systems, or entities. Client devices 200 may be managed or owned by one or more users of the content sharing system 100. In some embodiments, client applications that run on such devices may access documents or other content provided by the content sharing system 100, e.g., to view and modify documents. In some embodiments, a client device 200 may be implemented using any suitable number and configuration of computing devices, any of which may be implemented by the example computing device 3000 illustrated in FIG. 11. Client devices 200 may convey network-based requests to the content sharing system 100 via one or more networks, e.g., to provide user input to select one or more documents or other units of content whose metadata is presented by the content sharing system 100. The network(s) may encompass any suitable combination of networking hardware and protocols necessary to establish network-based communications between client devices 200 and the content sharing system 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device 200 and the content sharing system 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device 200 and the Internet as well as between the Internet and the content sharing system 100. In one embodiment, client devices 200 may communicate with the content sharing system 100 using a private network rather than the public Internet. In various embodiments, the various components of the content sharing system 100 may also communicate with other components of the content sharing system using one or more network interconnects.

Figure 3:
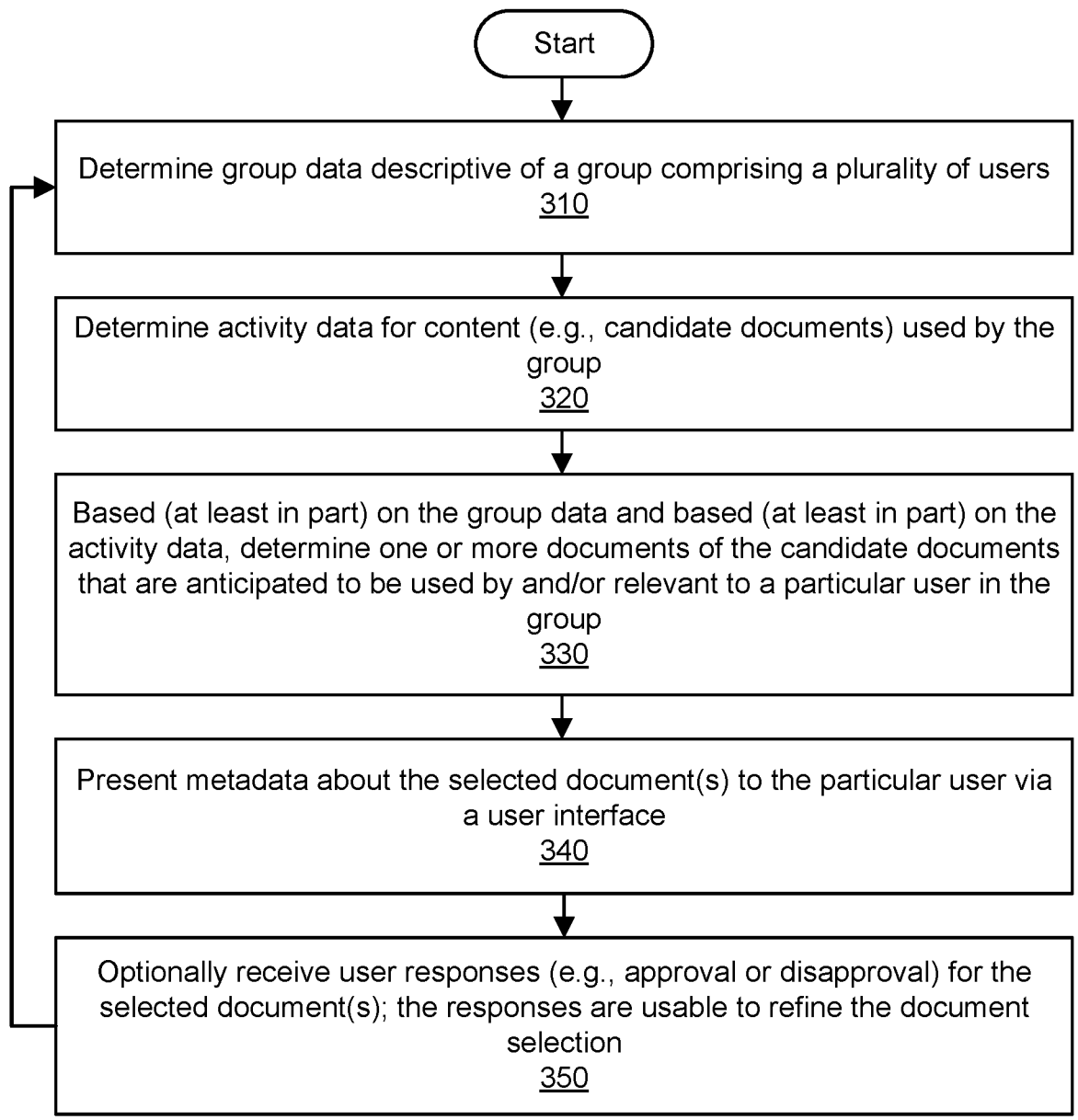
FIG. 3 is a flowchart illustrating a method for personalized content discovery in a collaborative environment, according to some embodiments.

FIG. 3 is a flowchart illustrating a method for personalized content discovery in a collaborative environment, according to some embodiments. As shown in 310, group data may be determined by a content sharing system. The group data may be data descriptive of a user group comprising a plurality of users. The group data may include identities of the users and one or more relationships between individual ones of the users. The group data may include group hierarchy information that indicates the relationships of individuals or teams with other individuals or teams, e.g., with supervisory relationships or other hierarchical relationships. The group data may include employee roles and/or employee departments. The group data may include security group membership. The group data may include employee relationships with co-workers. The group data may include user-specific content interests. In some embodiments, the group data and/or metadata may be derived from a directory service.

As shown in 320, activity data may be determined by the content sharing system. The activity data may be associated with content accessed by the user group, such as a plurality of documents. The set of documents may represent candidate documents for user-specific recommendations. Document contents and/or metadata may include document classifications, document version changes, document ownership, document access privileges, keyword matches to user or team activities, and so on. The activity data may measure interactions and engagement by the group with respect to the group's content. For example, the activity data may indicate recently accessed documents, recently linked documents, recently uploaded documents, recently updated documents, and/or frequently accessed documents. The activity data may be generated by document access monitoring that tracks users' interactions and engagement with the set of documents to which the group has access. The activity data may include any collaboration history between users, e.g., where two or more users that have both edited the same document(s) may have a collaboration history. The activity data may include users' reactions such as approval ("likes") and disapproval ("dislikes") provided for individual documents, team posts, comments, and so on. In some embodiments, the operation shown in 320 may be performed before the operation shown in 310, after the operation shown in 310, or concurrently with the operation shown in 310.

As shown in 330, the content sharing system may determine or select one or more documents of the plurality of documents that are anticipated to be accessed by a particular user in the user group and/or relevant to the particular user. These predictions may be performed based (at least in part) on the group data and based (at least in part) on the activity data. To reflect users' real-world focus on a small number of discrete tasks at any one time, the set of recommended documents may be much smaller than the set of candidate documents. The predictions may be generated for a particular user for a particular period of time (e.g., the current day or week) and may change over time. To select documents for a particular user, the content sharing system may use one or more machine learning and/or automated reasoning models, e.g., using a rule processor or rules engine that applies rules to a set of candidate documents in order to determine document relevance for a particular user and a particular context (e.g., group membership, time period, and so on). A particular rule may include one or more inputs, one or more actions to be taken in response to the input(s), and potentially other reasoning about actions to be taken. The inputs that drive the automated reasoning may be part of the group data, the document contents and metadata, the activity data, and so on. In some embodiments, the document selection shown in 330 may be triggered at certain times of day. In some embodiments, the document selection shown in 330 may be triggered by the user accessing a customized page to view document recommendations. In some embodiments, the document selection shown in 330 may be triggered by changes to the group data, the content itself, and/or the activity data.

As shown in 340, data descriptive of the one or more documents may be presented to the particular user via a user interface. For example, document metadata presented via the user interface may include document titles, document ownership, document creation history (e.g., the identity of the creator and/or the date at which the document was created), document editing history (e.g., the identity of the last editor and/or the date at which the document was last edited), content previews, thumbnail images, and/or other descriptive information. The user may view the descriptions of recommended documents in the user interface. The content sharing system may provide access to content without requiring users to manually search for specific documents. The content sharing system may provide access to content without requiring users to know where documents are located. In some embodiments, when a user selects one of the recommended documents, the content sharing system may launch (or cause to be launched) an appropriate application which may present the selected item to the user for viewing, downloading, editing, commenting, approving, and so on.

As shown in 350, the content sharing system may optionally receive user responses to particular ones of the recommended documents. The responses may include users' express reactions such as approval ("likes") and disapproval ("dislikes") of individual documents, team posts, comments, and so on. The responses may include users' implicit approval or disapproval of particular documents, e.g., as measured by user engagement with documents and/or a user ignoring document recommendations. The selection of recommended documents may be refined based (at least in part) on such responses, e.g., to remove documents for which the user expressed disapproval, add new documents, or change the order in which documents are presented. As shown in FIG. 3, the set of recommended documents for a particular user may be refined again and again based (at least in part) on changes to group data, changes to activity data, user responses to selected documents, events, and so on.

The presentation of the one or more documents may be specific to and customized for the particular user. When a different user accesses the user interface, a different set of documents may be presented, even if the different user is part of the same group(s) as the particular user. Using customized content discovery for particular users in a particular group context, the content sharing system may facilitate easier and faster collaboration among users in the group such that shared goals are completed more rapidly.

FIG. 4 illustrates an example of a personalized user interface usable for personalized content discovery in a collaborative environment, according to some embodiments. After determining a set of documents 155 that are anticipated to be relevant to a particular user 10, the content sharing system 100 may present metadata 165 about the documents in the user interface 160. For example, document metadata 165 may include document titles, document ownership, document creation history (e.g., the identity of the creator and/or the date at which the document was created), document editing history (e.g., the identity of the last editor and/or the date at which the document was last edited), content previews, thumbnail images, file-type-specific icons, and/or other descriptive information. The user 10 may view the descriptions of recommended documents in the user interface 160. In some embodiments, the user 10 may view the metadata 165 and potentially access selected documents via the interface 160 without needing to know document names or document locations.

As shown in the example of FIG. 4, the personalized user interface 160 may indicate a team name 410 representing a group 20 to which the user 10 belongs. In some embodiments, if a user 10 is part of more than one team, the user may access different versions of the interface 160 for different teams. In some embodiments, a user who is part of multiple teams may access all the teams via the same interface 160. In some embodiments, the interface 160 may indicate a set of actions 420 which the user 10 can perform with respect to the group 20. For example, the actions 420 may include an "upload file" action 421 to add a file for the group, a "create task" action 422 to create an action item for the user 10 or someone else in the group 20, an "add user" action 423 to add someone to the group 20, a "create topic" action 424 to create a discussion topic for the group (where the topic may be accessible using the interface 160 itself or using a different application), a "create group" action 425 to create another group, a "new post" action 426 to add a new post visible to the group 20, and so on.

In some embodiments, the interface 160 may indicate a set of personalized recommendations of documents 430 for the user 10. The documents 430 may be labeled such as "What's Happening Today" to indicate their importance to the user 10. For example, the recommendations 430 may include data describing a meeting 431 scheduled for today, data describing a document 432 awaiting feedback from the user 10, data describing recent chat replies 433 that are relevant to the user 10, data describing a newly uploaded document 434 that is relevant to the group 20, data describing a new event invitation 435 to which the user 10 is expected to respond, and so on.

In some embodiments, the interface 160 may indicate a set of action items 440 for the user 10. The action items 440 may be labeled such as "Tasks Due Soon" to indicate their importance to the user 10. For example, the action items 440 may include a task 441 to complete a revision of a particular document by a deadline of 1 PM today, a task 442 to schedule calls by 10 AM tomorrow, an action item 443 to respond to a feedback request from another team member by Friday, and so on. In some embodiments, the interface 160 may indicate other information relevant to the group 20, such as a set of recent posts 450 in team discussions. For example, the recent posts 450 may include a first post 451 by a team member, another post 452 by the same or a different team member, another post 453 by another team member, and so on. By presenting the various types of information 430, 440, and 450 in one personalized interface 160, the content sharing system 100 may provide easy access to the most relevant documents for a particular user 10 at a particular point in time.

In some embodiments, fewer documents may be presented to the user 10 in the user interface 160 at a given time than the total set of recommended documents for that user. For example, the user interface 160 may contain slots for up to M files, up to N action items, and so on, but the recommended documents may include more than M files and/or more than N action items. In some embodiments, after a user 10 has interacted with the recommendations (e.g., to view a particular file or mark an action item as completed), one or more documents may be removed from the display and replaced with one or more newer items from the set of recommended documents 155. In some embodiments, the user interface 160 may implement an "infinite scroll" feature such that the user 10 can browse through document descriptions until no more recommended documents are available. In some embodiments, such a feature may present documents in order from most relevant to least relevant.

Figure 5:
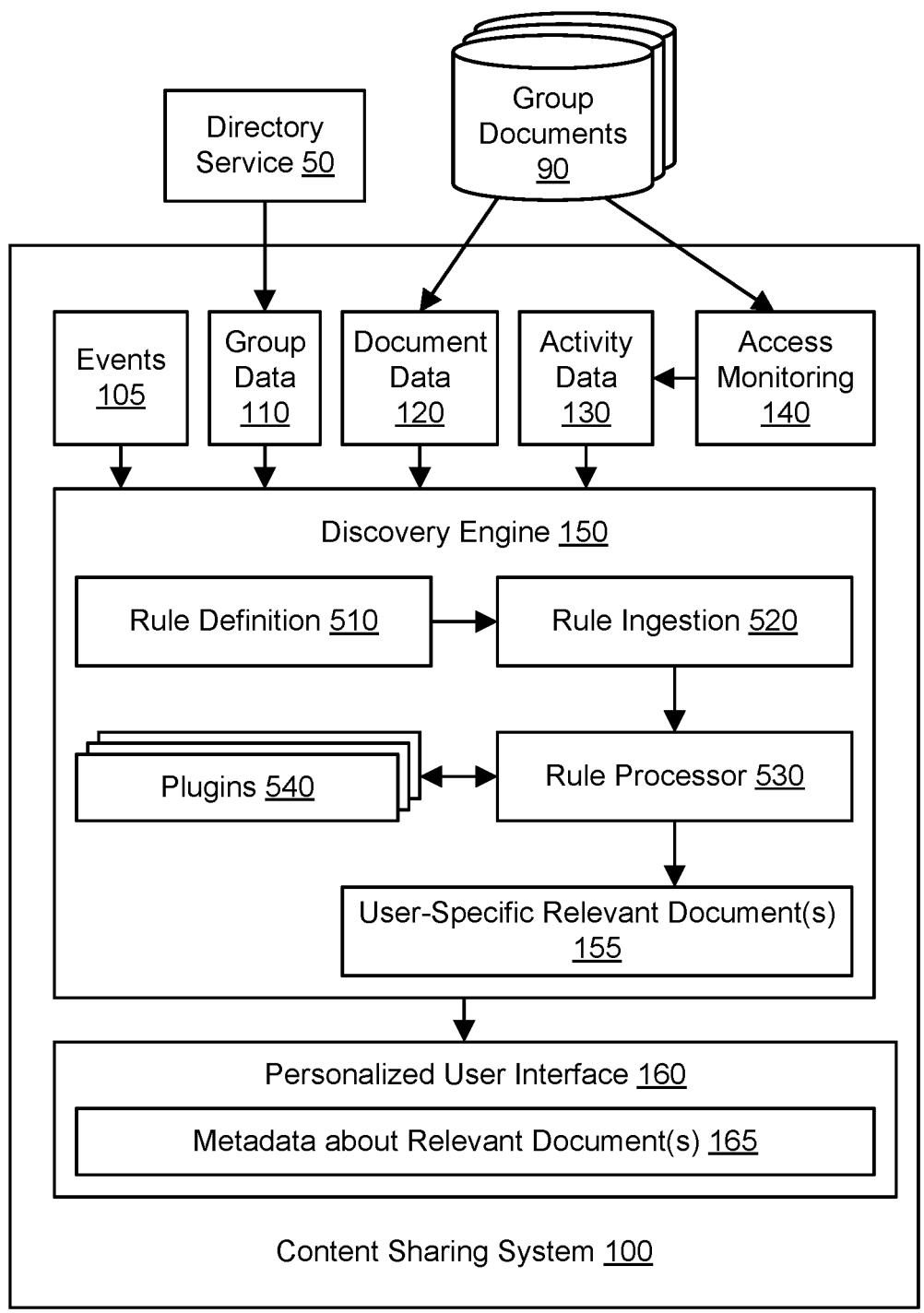
FIG. 5 illustrates further aspects of the example system environment for personalized content discovery in a collaborative environment, including a rule processor configured to determine relevant documents, according to some embodiments.

FIG. 5 illustrates further aspects of the example system environment for personalized content discovery in a collaborative environment, including a rule processor configured to determine relevant documents, according to some embodiments. As discussed above, the content sharing system 100 may include a rule processor or rules engine 530 that applies rules in order to determine relevant documents for a particular user and a particular context (e.g., group membership, time period, and so on). The rule processor 530 may implement automated reasoning techniques such that particular actions are taken if particular inputs are encountered. The inputs that drive the automated reasoning according to rules may be part of group data 110, document contents and metadata 120, activity data 130, and so on.

Rules may be triggered by events 105. Events 105 that trigger rules may often relate to the status of the documents 90, e.g., as indicated by the document data 120. For example, events 105 that trigger rules may include uploading a document, tagging a document, creating a folder, editing a document, opening a document, creating a meeting, and so on. In some embodiments, events 105 that trigger rules may relate to the group data 110 and/or activity data 130. At least some of the events 105 may be generated using the access monitoring 140. A component for rule definition 510 may permit users to define rules. A particular rule may include one or more inputs, one or more actions to be taken in response to the input(s), and potentially other reasoning about actions to be taken. The component for rule definition 510 may act as a repository for rules.

The component for rule definition 510 may permit a component for rule ingestion 520 to determine if there is a rule to be triggered by an event. If there is a rule to be triggered, then the rule ingestion 520 may prepare an instance of a rule event and place it on a queue for processing by the rule processor 530. The instance of the rule event may represent a specific instance of a template associated with a rule definition. The rule processor 530 may route the rule event to one or more appropriate plugins of a set of plugins 540. The rule processor 530 may know how to route the rule event to the proper plugin(s) and may also perform error handling if necessary. The plugins 540 may interact with a variety of services to fulfill their tasks, e.g., to perform text extraction. The plugins 540 may retrieve any inputs, perform any processes, create outputs, and add a message with output metadata to a queue for the rule processor 530 so that the rule processor can route the event to the next plugin.

Content Importing with Discovery in a Collaborative Environment

Figure 6:
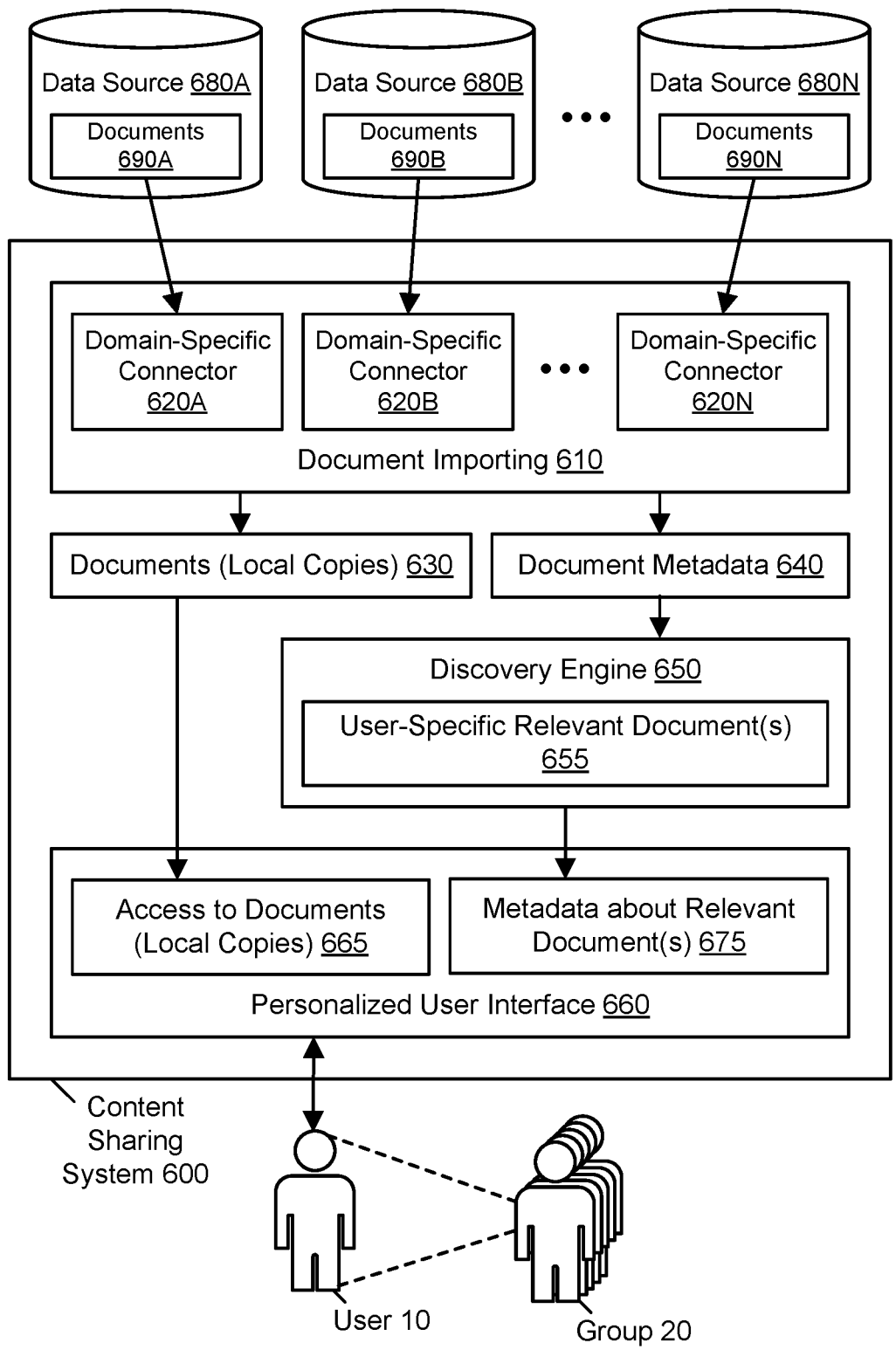
FIG. 6 illustrates an example system environment for content importing with discovery in a collaborative environment, according to some embodiments.

FIG. 6 illustrates an example system environment for content importing with discovery in a collaborative environment, according to some embodiments. A content sharing system 600 may perform content management in an enterprise environment. In some embodiments, the content sharing system 600 may implement aspects of the content sharing system 100 discussed above. The enterprise environment may include numerous users (e.g., information workers, managers, and so on) who may be divided among different groups or teams. A particular user 10 may be part of one or more groups such as group 20 and/or other groups. The enterprise environment may foster collaboration such that various groups of users work together towards shared goals via the use of computer systems. To accomplish such goals, individual users may perform individual tasks such as reading documents, editing documents, attending meetings, responding to requests from other users in a group, and so on. The enterprise environment may include a large volume of content that users may need to access in order to perform tasks. The content may include individual elements of content or units of content such as documents, files, or data structures expressed in various formats, e.g., proprietary formats used by particular applications or standardized formats used by many applications. For example, documents 690A and 690B through 690N as well as other units of content within the content sharing system 600 may include word processing files, text files, spreadsheets, PDF documents, XML documents, images, audio, video, meeting invites, action items, and so on.

The content sharing system 600 may import individual ones of documents 690A and 690B through 690N from heterogeneous data sources 680A and 680B through 680N. The data sources 680A-680N may differ in terms of storage formats. The data sources 680A-680N may differ in terms of the application programming interfaces (APIs) or other programmatic interfaces that are used by the content sharing system 600 to request and retrieve data. The data sources 680A-680N may differ in terms of the authorization techniques by which access is granted for particular data. The data sources 680A-680N may differ in terms of how files and folders are structured and how such structures are traversed. To facilitate importing 610 of documents 690A-690N from heterogeneous data sources 680A-680N, the content sharing system 600 may use domain-specific connectors that implement the techniques and data needed to retrieve documents from a particular data source using a user's credentials. For example, domain-specific connector 620A may be configured to retrieve data from data source 680A, domain-specific connector 620B may be configured to retrieve data from data source 680B, and domain-specific connector 620N may be configured to retrieve data from data source 680N.

The domain-specific connectors 620A-620N may differ in terms of the data source APIs they are configured to use, the authorization techniques they are configured to use to gain access to a user's documents and metadata, and so on. For example, to import one of documents 690A from data source 680A, the connector 620A may acquire one or more security credentials of the user 10. In some embodiments, the content sharing system 600 may acquire the credential(s) from the user 10 for use in importing document using the credential(s). The domain-specific connector 620A may submit the user's credential(s) to the data source 680A and be permitted to retrieve the desired document based (at least in part) on the credential(s).

In some embodiments, the user 10 may specify metadata sufficient to identify and/or locate a document to be imported from one of the data sources 680A-680N. For example, the user 10 may indicate the name and/or path of the document along with the name of the data source. As another example, the user 10 may indicate other characteristics of a document to be imported, such as an identifier of a team member who created the document or most recently updated the document, a file creation date or range of dates, a file modification date or range of dates, and other such metadata. As yet another example, the user 10 may specify a pathname or location (e.g., a uniform resource locator) of the document, and the system 600 may identify the particular data source based (at least in part) on the specified location. As an additional example, the user 10 may use an index of available documents and select one or more of the documents to import. The content sharing system may automatically select the appropriate one of the domain-specific connectors 620A-620N for use in importing a document from a particular data source.

The document importing 610 may store local copies 630 of imported documents using storage resources accessible to the content sharing system 600. For example, the content sharing system 600 may implement a digital repository that stores the local copies 630. A personalized user interface 660 may provide the user 10 with access 665 to the local copies 630 of the documents. The personalized user interface 660 may implement aspects of the personalized user interface 160 discussed above. In some embodiments, an imported document may be copied from a data source to the content sharing system 600 such that the original source copy may be maintained by the data source while the local copy is updated and/or maintained by the content sharing system 600. In some embodiments, changes from one or more users may be made first to the local copy of the document, and the changes may be propagated to the source copy using periodic synchronization. In some embodiments, an imported document may be moved from a data source to the content sharing system 600 such that the original source copy may be deleted from the data source or no longer maintained by the data source while the local copy is updated and/or maintained by the content sharing system 600. In some embodiments, importing 610 may include copying the document's metadata from the data source to the content sharing system 600. For example, the copied metadata may include activity data, sharing data, tags, labels, and so on. In some embodiments, importing 610 may include copying the document's permissions from the data source to the content sharing system 600 to ensure that unauthorized users cannot view or edit documents within the content sharing system 600.

In some embodiments, the domain-specific connectors 620A-620N may also retrieve metadata 640 associated with other documents that have not necessarily been imported. The document metadata 640 may be retrieved from one or more of the data sources 680A-680N using the credential(s) of the user 10. For example, the metadata for individual documents may include access control lists, creation dates, last modification dates, last editor IDs, last read dates, tags, labels, and so on. The metadata 640 may include activity data associated with accessing documents, updating documents, sharing documents, and so on. The metadata 640 may include sharing data that indicates the users for which particular documents have been shared. The metadata 640 may include permissions or access control lists (ACLs) for particular documents. In some embodiments, the metadata may include user schedules or events obtained from one or more scheduling or calendar systems.

Using the metadata 640, a discovery engine 650 may determine one or more additional documents 655 that are anticipated to be accessed or shared by the user 10 over some time frame or otherwise deemed to be relevant to the user. The discovery engine 650 may calculate relevance scores for individual documents, e.g., based (at least in part) on document ownership, document activity, document sharing, and other metadata. A rule processor may determine a relevance score for a document based (at least in part) on a sum or weighted average of individual values or points for characteristics such as the document's owner, the relationship of the owner to the user, the number of users who have edited the document, the number of users who have shared the document, and so on. For example, a particular document may be assigned points towards a relevance score based on the user being the owner of the document, the user's supervisor having edited the document, the document having been shared with at least three people in the user's group, and so on. The discovery engine 650 may determine that the most relevant document(s) 655 have a high relevance score, e.g., relative to other analyzed documents and/or a pre-determined relevance threshold value. The user-specific relevant document(s) 655 may be imported, recommended to the user for importing, shared with other users in the group 20, recommended for sharing with other users, and so on. Data 675 describing the relevant document(s) may be presented via the personalized user interface 660. The metadata 675 about the relevant document(s) may include, for example, document titles, document thumbnail images, document summaries, document activity data, document sharing data, and so on. In some embodiments, after reading the metadata 675, the user 10 may choose to import specific ones of the documents 655, e.g., by clicking on a title or thumbnail or otherwise selecting an "import," "copy", or "move" task for the document via a corresponding user interface element. The document may then be imported from one of the data sources 680A-680N using the appropriate one of the domain-specific connectors 620A-620N and using the credential(s) of the user 10. A local copy of the imported document may be stored with the other local copies 630. In some embodiments, the content sharing system 600 may automatically determine a relevant document to be imported from one of the data sources 680A-680N using the appropriate one of the domain-specific connectors 620A-620N, e.g., without necessarily asking the user 10 whether the document should be imported.

The content sharing system 600 may facilitate easier access to content by providing, for particular users in a group, intelligent and personalized content discovery for the documents 690A-690N (including files as well as meeting invites, action items, and so on) that are expected to be most relevant to a particular user 10 or group 20 for a given time period. The content sharing system 600 may provide access to content without requiring users to manually search for specific documents. The content sharing system 600 may provide access to content without requiring users to know where documents 690A-690N are located. The content sharing system 600 may provide access to content from a variety of repositories or data sources 680A-680N using a personalized user interface 660. The data sources may include a user's own storage as well as group storage and/or other users' storage. The content sharing system 600 may provide access to content in a variety of formats using the personalized user interface 660. Using customized content discovery for particular users in a particular group context, the content sharing system 600 may facilitate easier and faster collaboration among users in the group such that shared goals are completed more rapidly.

Using the discovery engine 650, the content sharing system 100 may use automated techniques to identify or predict documents 690A-690N (such as files, action items, meeting invites, and so on) that are relevant to a particular user 10. The recommended documents 655 may be selected from a set of candidate documents 690A-690N to which the user 10 has access. To reflect users' real-world focus on a small number of discrete tasks at any one time, the set of recommended documents 655 may be much smaller than the set of candidate documents 690A-690N. The predictions may be generated for a particular user 10 for a particular period of time (e.g., the current day or week) and may change over time. In some embodiments, recommendations may change due to observed patterns for document importance at particular times of the week, for different times of the year, and so on. The content sharing system 600 may predict documents 655 (or other units of content) that the user 10 is anticipated to access for a particular time period and/or that have the most relevance to the user for the particular time period. For example, if a user 10 is a new addition to a group 20, then the content sharing system 600 may select a set of onboarding documents that have been identified by a team leader for new members to read. As another example, if a user 10 has been invited to a meeting, then the content sharing system 600 may select one or more documents 655 that are being viewed by other users invited to the meeting.

The content sharing system 600 may select relevant documents 655 based (at least in part) on group data and/or metadata 110, e.g., as discussed with reference to FIG. 1. Group data and/or metadata 110 may include group hierarchy information that indicates the relationships of individuals or teams with other individuals or teams, e.g., with supervisory relationships or other hierarchical relationships. In some embodiments, the group data and/or metadata 110 may be used to generate a graph of user relationships, including hierarchical relationships. Group data and/or metadata 110 may include employee roles and/or employee departments. For example, the system 100 may recommend a document for a member of a team after observing that many other members of the same team have viewed the document recently. Group data and/or metadata 110 may include security group membership. Group data and/or metadata 110 may include employee relationships with co-workers. Group data and/or metadata 110 may include user-specific content interests. For example, the system 100 may recommend a document for a user in response to observing that a document has been tagged with a particular label which is of interest to the user. In some embodiments, the group data and/or metadata 110 may be derived from a directory service 50, e.g., a service implemented according to Lightweight Directory Access Protocol (LDAP). The directory service 50 may maintain information about user identities, user relationships, and user metadata usable to manage permissions and access to network resources.

The content sharing system 600 may select relevant documents 655 based (at least in part) on document contents and/or metadata 120 for a set of documents 690A-690N accessible to a particular group 20, e.g., as discussed with reference to FIG. 1. The set of documents 690A-690N may represent candidate documents for a discovery engine 650. Document contents and/or metadata 120 may include document titles, document tags, document classifications, document version changes, document ownership, document access privileges, keyword matches to user or team activities, and so on. In various embodiments, the document data and/or metadata 120 may include usage or engagement data 130, or the activity data 130 may be independent of the document data 120. The activity data 130 may measure interactions and engagement by the group with respect to the group's content. For example, the activity data 130 may indicate recently accessed documents, recently linked documents, recently uploaded documents, recently updated documents, and/or frequently accessed documents. In some embodiments, a greater frequency of activity (e.g., viewing, editing, adding, downloading, sharing, or commenting) for a document within a team may tend to be linked to greater relevance or importance and thus a greater chance of the document being recommended to team members. In some embodiments, a greater recency of activity (e.g., viewing, editing, adding, downloading, sharing, or commenting) for a document within a team may tend to be linked to greater relevance or importance and thus a greater chance of the document being recommended to team members. The document contents and/or metadata 120 or activity data 130 may include mentions of users in group posts or comments. The document contents and/or metadata 120 or activity data 130 may include any collaboration history between users, e.g., where two or more users that have both edited the same document(s) may have a collaboration history. The document contents and/or metadata 120 or activity data 130 may include users' reactions such as approval ("likes") and disapproval ("dislikes") provided for individual documents, team posts, comments, and so on. The set of recommended documents 655 may be refined based (at least in part) on such responses, e.g., to remove documents for which the user expressed disapproval.

The content sharing system 600 may select relevant documents 655 based (at least in part) on events 105, e.g., as discussed with reference to FIG. 1. In some embodiments, the events 105 may represent calendar events such as meetings. In some embodiments, the events 105 may represent events that recur on a predictable schedule. For example, if the system 100 determines that a meeting with a particular title and the same (or similar) set of invitees occurs weekly at the same day and at the same time, the system may create a recurring event for the meeting. The recurring event may be used to make content recommendations for users invited to the meeting. The events 105 may also be used to capture seasonality of document-related activities. For example, some documents may be used (e.g., read, edited, shared, and so on) more frequently at the first of the month or at certain times of the year, and such usage patterns may drive the personalized recommendation of documents by the discovery engine 650. In some embodiments, at least some of the events 105 may be determined using access monitoring. In some embodiments, events 105 may serve as triggers for evaluation of rules by a rules engine.

The content sharing system 600 may present the selected documents 655 to the user as recommendations or suggestions. The recommendations may be presented to the user via a personalized user interface 660 that implements a graphical user interface (GUI), command-line interface (CLI), and/or voice-activated interface. In some embodiments, recommendations may be generated by the content sharing system 600 and provided to one or more external front-end systems with which the user may interact, e.g., by using one or more application programming interfaces (APIs) or other programmatic interfaces to send the document metadata from the content sharing system 100 to the one or more external systems. Via the user interface 660, related content from different repositories and/or applications, including the local copies 630 of imported documents, may be shared in a single location for members of the team. The user interface 660 may represent a customized landing page for users such that content (e.g., recommended documents 655) presented via the user interface may vary from user to user. The user interface 660 may present files being collaborated upon, team members with whom to connect, team activities in which to participate, and so on. The user interface 660 may be compliant with security policies and regulatory policies.

After determining a set of documents 655 that are anticipated to be relevant to a particular user 10, the content sharing system 600 may present metadata 675 about the documents in the user interface 660. For example, document metadata 675 may include document titles, document ownership, document creation history (e.g., the identity of the creator and/or the date at which the document was created), document editing history (e.g., the identity of the last editor and/or the date at which the document was last edited), content previews, thumbnail images, and/or other descriptive information. The user 10 may view the descriptions of recommended documents in the user interface 660. In some embodiments, the user 10 may view the metadata 675 and potentially access imported copies of selected documents via the interface 660 without needing to know document names or document locations.

In some embodiments, the set of recommended documents 655 may be generated or updated at appropriate points in time, and the presentation via the user interface 660 may be updated accordingly. For example, the set of recommended documents 655 for a particular user 10 may be generated or updated every day at a particular time. As another example, the set of recommended documents 655 may be generated or updated after the user 10 has accessed or used one or more of the documents or after an item has expired, e.g., by marking an action item as completed or upon conclusion of a meeting. As a further example, the set of recommended documents 655 may be generated or updated in real-time or near-real-time when the user 10 accesses the user interface 660. As yet another example, the set of recommended documents 655 may be generated or updated in response to updates to the group data 110, such as when a user 10 joins a new group or when a user's role changes. As yet another example, the set of recommended documents 655 may be generated or updated in response to updates to the document data 120 and/or activity data 130, e.g., such that one or more rules are triggered using a rule processor. As a further example, the set of recommended documents 655 may be generated or updated in response to events 105.

In one embodiment, one or more components of the content sharing system 600 may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture, e.g., to provide the functionality and resources of the content sharing system 600. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the content sharing system 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network. In one embodiment, portions of the functionality of the provider network, such as the content sharing system 600, may be offered to clients in exchange for fees.

In various embodiments, components of the content sharing system 600 may be implemented using any suitable number and configuration of computing devices, any of which may be implemented by the example computing device 3000 illustrated in FIG. 11. In some embodiments, the computing devices may be located in any suitable number of data centers or geographical locations. In various embodiments, at least some of the functionality of the content sharing system 600 may be provided by the same computing device or by different computing devices. In various embodiments, if any of the components of the content sharing system 600 are implemented using different computing devices, then the components and their respective computing devices may be communicatively coupled, e.g., via one or more networks. Any of the components of the content sharing system 600 may represent any combination of software and hardware usable to perform their respective functions. In some embodiments, operations implemented by the content sharing system 600 may be performed automatically, e.g., without a need for user initiation or user intervention after an initial configuration stage, and/or programmatically, e.g., by execution of program instructions on at least one computing device. In some embodiments, the content sharing system 600 may include additional components not shown, fewer components than shown, or different combinations, configurations, or quantities of the components shown.

Figure 7:
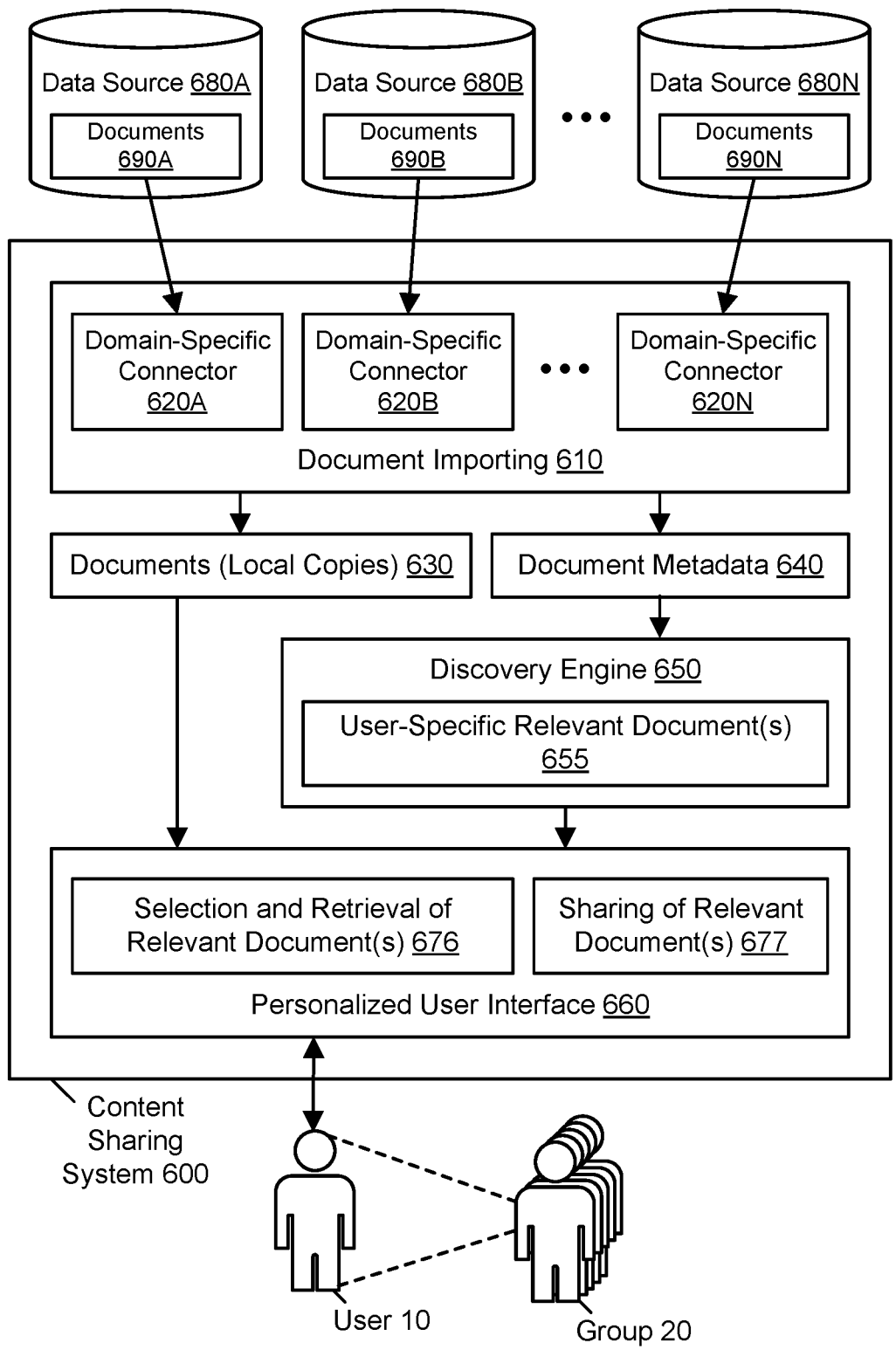
FIG. 7 illustrates further aspects of the example system environment for content importing with discovery in a collaborative environment, including importing and sharing of relevant documents, according to some embodiments.

FIG. 7 illustrates further aspects of the example system environment for content importing with discovery in a collaborative environment, including importing and sharing of relevant documents, according to some embodiments. As discussed above, the user 10 may view the descriptions 665 of recommended documents in the user interface 660. The user interface 660 may include a component for selection and retrieval 676 of relevant documents. Using the component for selection and retrieval 676, the user 10 may select one or more of the recommended documents 655, e.g., by clicking on corresponding elements of the metadata 665 such as document titles, preview images, and so on. The system 600 may then securely retrieve the selected document(s) from one or more data sources 680A-680N using one or more domain-specific connectors 620A-620N and the user's credential(s). The system 600 may store local copies 630 of the selected document(s). In some embodiments, the system 600 may then cause the copies of imported document(s) to be sent to a client device 200 operated by the user 10.

In some embodiments, the user interface 660 may include a component for sharing 677 of relevant documents. Using the sharing component 677, the user 10 may select one or more of the relevant documents 655 to be shared with other users in the group 20. For example, the user 10 may click on corresponding elements of the metadata 665 such as document titles, preview images, and so on. The system 600 may then securely retrieve the selected document(s) from one or more data sources 680A-680N using one or more domain-specific connectors 620A-620N and the user's credential(s). In some embodiments, the system 600 may then make local copies of the imported document(s) accessible by the group 20, e.g., via other personalized user interfaces of the content sharing system 600. In some embodiments, documents may be automatically shared with other users in the group 20. For example, if the discovery engine 650 determines that a particular document is relevant to attendees of an upcoming event, and if the document's permissions allow sharing, then the document may be automatically shared with that set of users. As another example, if one document has been automatically shared with a group, then under some circumstances, a similar document may be shared automatically with that group. In some embodiments, the discovery engine 650 may recommend sharing a document to the remaining members of a group 20 to whom the document has not yet been shared.

Figure 8:
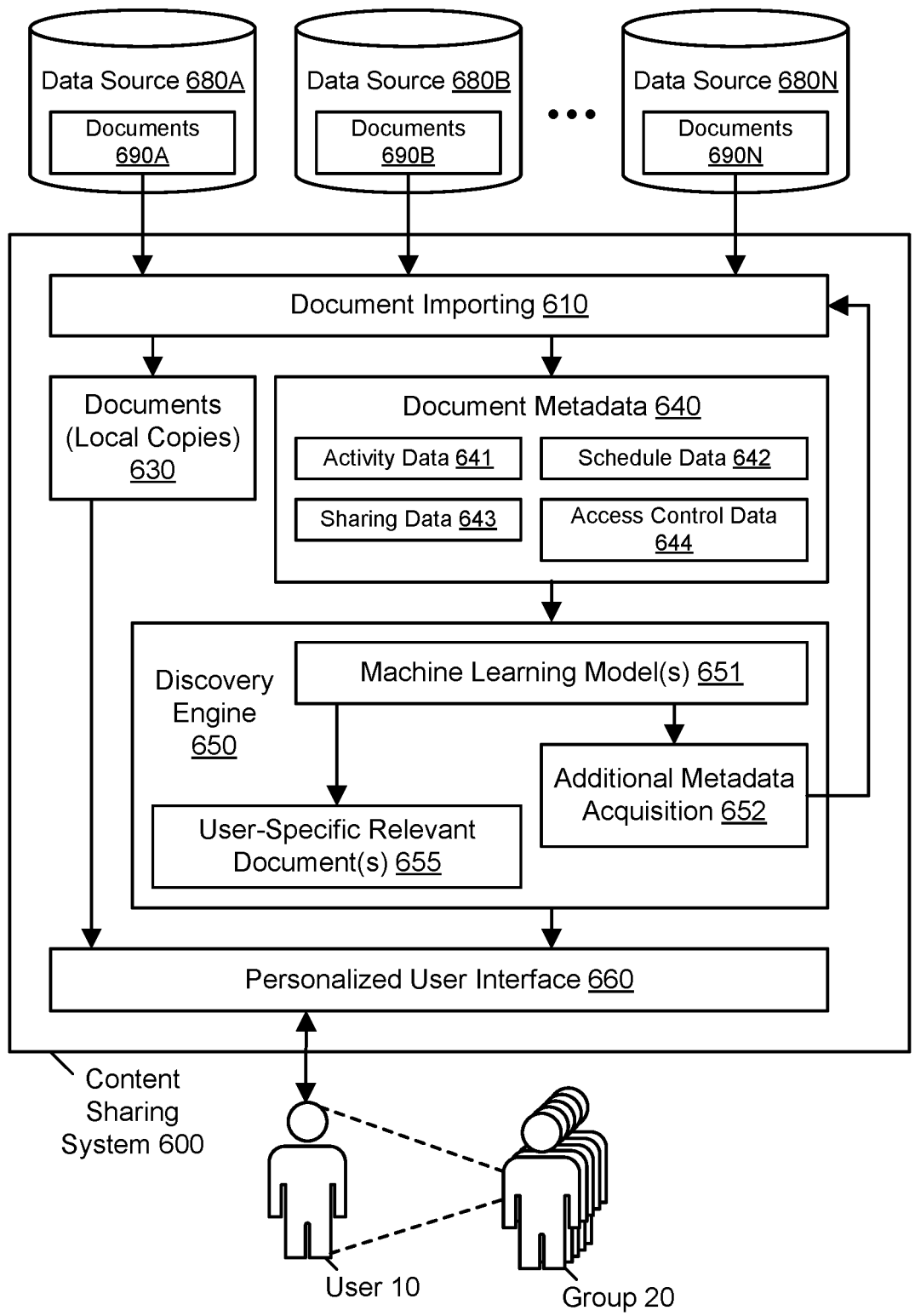
FIG. 8 illustrates further aspects of the example system environment for content importing with discovery in a collaborative environment, including the use of machine learning models to determine relevant documents based (at least in part) on document metadata, according to some embodiments.

FIG. 8 illustrates further aspects of the example system environment for content importing with discovery in a collaborative environment, including the use of machine learning models to determine relevant documents based (at least in part) on document metadata, according to some embodiments. In some embodiments, the domain-specific connectors 620A-620N may retrieve metadata 640 associated with other documents that have not necessarily been imported. The document metadata 640 may be retrieved from one or more of the data sources 680A-680N using the credential(s) of the user 10. For example, the metadata 640 may include activity data 641 associated with accessing documents, updating documents, sharing documents, and so on. In some embodiments, the metadata 640 may include schedule data 642 obtained from one or more scheduling or calendar systems. As another example, the metadata 640 may include sharing data 643 that indicates the users for which particular documents have been shared. As a further example, the metadata 640 may include access control data 644 (e.g., permissions or access control lists) associated with particular documents.

To select documents 655 for a particular user 10, the content sharing system 600 may use one or more machine learning and/or automated reasoning models 651. In some embodiments, the discovery engine 650 may include a rule processor or rules engine that applies rules to a set of candidate documents in order to determine document relevance for a particular user and a particular context (e.g., group membership, time period, and so on). The rule processor may implement automated reasoning techniques such that particular actions are taken if particular inputs are encountered. A particular rule may include one or more inputs, one or more actions to be taken in response to the input(s), and potentially other reasoning about actions to be taken. In some embodiments, the inputs that drive the automated reasoning may be part of activity data 641, schedule data 642, sharing data 643, access control data 644, and so on. For example, the machine learning model(s) 651 may determine that a meeting invite is relevant for a user's day if the meeting is scheduled for later that day. As another example, the machine learning model(s) 651 may determine that a particular document is relevant to a user if a sufficient number of other team members (e.g., a number at or beyond some threshold percentage of the team) have been accessing the document in the past day. As yet another example, the machine learning model(s) 651 may determine that a particular action item is relevant to a user if the action item is newly created or has an imminent deadline. Using such machine learning model(s) 651, personalized recommendations may become richer over time as the recommendations are refined based on a deeper understanding by the content sharing system 600 of user 10 and group activities. In some embodiments, the machine learning model(s) 651 may detect and alert upon anomalous behavior by users in terms of sharing documents, downloading documents, viewing documents, editing documents, and so on.

In some embodiments, the discovery engine 650 may use machine learning or automated reasoning model(s) 651 that are specific to documents. In some embodiments, the model(s) 651 may include one model for documents and another model for activity. For the document-related model, the discovery engine 650 may store a table that includes, for each file, the file name, the creation date, the most recent modification date, the most recent user to modify the file, and so on. For the activity-related model, the discovery engine 650 may store a table that includes, for each file, the most recent modification date, the users who modified the file, the users who modified the file most often, the highest-ranking of those users in an organizational hierarchy, and so on. The model(s) 651 may use both tables to find the documents related to a current activity. The model(s) 651 may use the tables to find usage patterns, e.g., which files have the most common activity, which files are among top N files in usage, which files are used on particular days, and so on. The model(s) 651 may perform user-level analysis to determine the users who are most active in terms of viewing files, editing files, commenting on files, and so on. The model(s) 651 may determine patterns among these users, e.g., which users are most active on particular days of the week or which users have similar usage with other users for the same documents.

In some embodiments, based (at least in part) on the output of the machine learning model(s) 651, the system 600 may perform additional metadata acquisition 652 from one or more of the data sources 680A-680N for refinement of the model output. For example, the machine learning model(s) 651 may determine that a particular document is likely to be relevant to attendees of an upcoming meeting, but the discovery engine 650 may be unsure if the document's permissions will allow sharing with all of those attendees. The discovery engine 650 may generate a request for access control data associated with the document from the appropriate data source. The system 600 may then use the appropriate domain-specific connector to retrieve the requested metadata and use the metadata to determine whether the relevant document can be shared.

Figure 9:
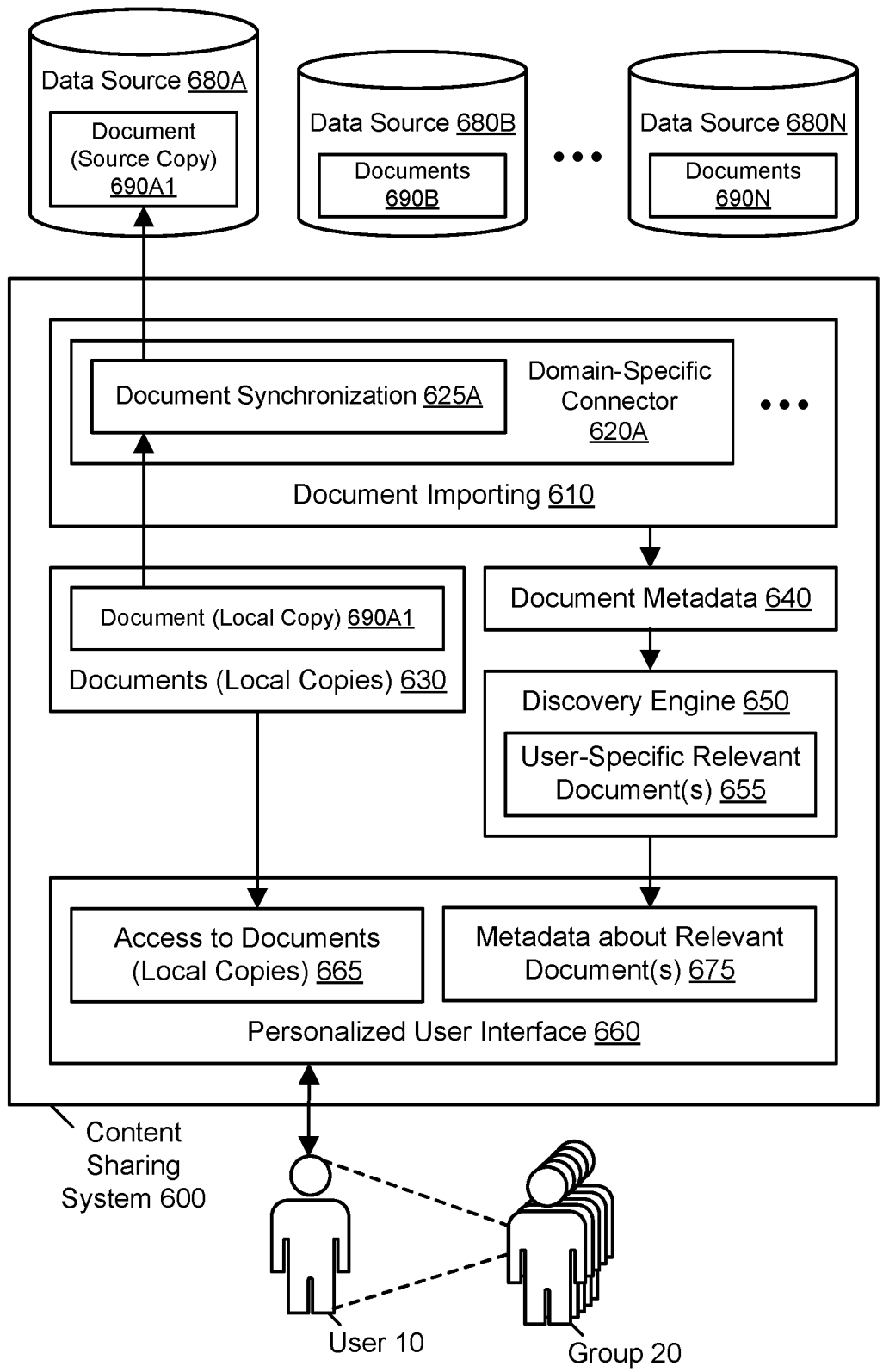
FIG. 9 illustrates further aspects of the example system environment for content importing with discovery in a collaborative environment, including synchronization of local copies and source copies of imported documents, according to some embodiments.

FIG. 9 illustrates further aspects of the example system environment for content importing with discovery in a collaborative environment, including synchronization of local copies and source copies of imported documents, according to some embodiments. In some embodiments, an imported document may be copied from a data source to the content sharing system 600, such that the original source copy may be maintained by the data source while the local copy is updated and/or maintained by the content sharing system 600. In some embodiments, changes from one or more users may be made first to the local copy of the document, and the changes may be propagated to the source copy using periodic synchronization. For example, changes from the user 10 may be applied to a local copy 690A1 of an imported document. On an appropriate periodic basis, e.g., every twenty-four hours, the content sharing system 600 may perform document synchronization 625A such that the source copy of the document is kept up-to-date with the local copy. In some embodiments, the document synchronization 625A may be implemented by the appropriate domain-specific connector 620A, e.g., using the knowledge and ability to interact with the particular data source 680A that maintains the source copy.

Figure 10:
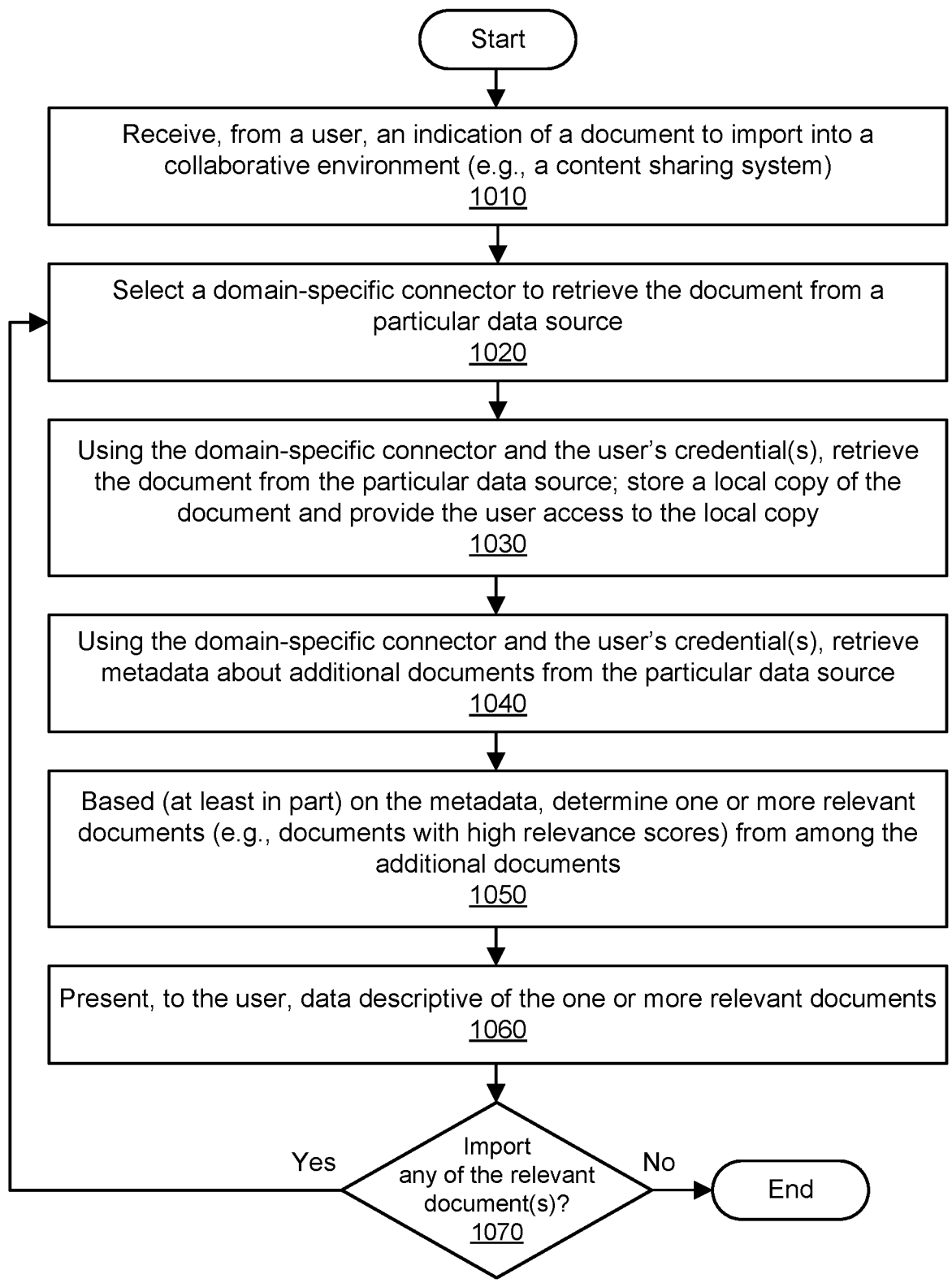
FIG. 10 is a flowchart illustrating a method for content importing with discovery in a collaborative environment, according to some embodiments.

FIG. 10 is a flowchart illustrating a method for content importing with discovery in a collaborative environment, according to some embodiments. As shown in 1010, an indication of a document to import into a collaborative environment (e.g., a content sharing system) may be received from a user. In some embodiments, the user may specify metadata sufficient to identify and/or locate a document to be imported from a data source external to the content sharing system. For example, the user may indicate the name and/or path of the document along with the name of the data source. As another example, the user may indicate other characteristics of a document to be imported, such as an identifier of a team member who created the document or most recently updated the document, a file creation date, a file modification date, and other such metadata. In some embodiments, the content sharing system may determine the document to be imported in the absence of input from the user.

As shown in 1020, a domain-specific connector may be selected for use in retrieving the document from a particular data source. The content sharing system may be configured to import documents from heterogeneous data sources. The data sources may differ in storage formats, in the application programming interfaces (APIs) or other programmatic interfaces usable to request and retrieve data, in the authorization techniques by which access is granted for particular data, in how files and folders are structured and how such structures are traversed, and so on. To facilitate importing of documents from these heterogeneous data sources, the content sharing system may use domain-specific connectors that implement the techniques and data needed to retrieve documents from a particular data source using a user's credentials. A domain-specific connector may be selected from the set of domain-specific connectors in order to retrieve the identified document from a particular data source that corresponds to the connector. The domain-specific connector may be selected based (at least in part) on metadata associated with the document, e.g., on the document's title, path, and/or location within a particular data source that corresponds to the connector.

As shown in 1030, the document may be retrieved from the data source using the domain-specific connector. The domain-specific connector may submit the user's credential(s) to the data source and be permitted to retrieve the desired document based (at least in part) on the credential(s). The content sharing system may store a local copy of the document, e.g., using storage accessible by the content sharing system. The content sharing system may make the local copy of the document available to the user, e.g., via a personalized user interface in which the user may select the document. The user may access the local copy of the document and, in some embodiments, edit the local copy of the document. In some embodiments, the imported document may be copied from the data source to the content sharing system such that the original source copy may be maintained by the data source while the local copy is updated and/or maintained by the content sharing system. In some embodiments, changes from one or more users may be made first to the local copy of the document, and the changes may be propagated to the source copy using periodic synchronization. In some embodiments, the imported document may be moved from a data source to the content sharing system such that the original source copy may be deleted from the data source or no longer maintained by the data source while the local copy is updated and/or maintained by the content sharing system.

As shown in 1040, metadata associated with additional documents may be retrieved from the data source using the domain-specific connector and the user's security credential(s). The metadata may describe aspects of additional documents that have not necessarily been imported to the content sharing system. For example, the metadata may include activity data associated with accessing documents, updating documents, sharing documents, and so on. As another example, the metadata may include sharing data that indicates the users for which particular documents have been shared. As a further example, the metadata may include permissions or access control lists (ACLs) for particular documents. In some embodiments, the metadata may include user schedules or events obtained from one or more scheduling or calendar systems.

As shown in 1050, based (at least in part) on the metadata, one or more relevant additional documents may be determined, e.g., by a discovery engine. The relevant additional document(s) may be deemed to be relevant to the interests of the user or a group to which the user belongs. The relevant additional document(s) may be deemed to be similar in one or more characteristics (e.g., related to activity or sharing) to documents that have been frequently shared or accessed within a group. In determining a document's relevance, the content sharing system may calculate a relevance score or relevancy score. For example, a rule processor may determine a relevance score for a document based (at least in part) on a sum or weighted average of individual values or points for characteristics such as the document's owner, the relationship of the owner to the user, the number of users who have edited the document, the number of users who have shared the document, and so on. The content sharing system may determine that the most relevant document(s) have a high relevance score, e.g., relative to other analyzed documents and/or a pre-determined relevance threshold value. In determining their relevance, the content sharing system may determine that the document(s) are anticipated to be accessed by the user or one or more members of a group to which the user belongs, e.g., within an appropriate time frame. The discovery engine may use one or more machine learning model(s) and/or rule processors to determine the relevant additional document(s).

As shown in 1060, data descriptive of the one or more relevant additional documents may be presented to the user, e.g., in a personalized user interface of the content sharing system. The presented metadata about the relevant additional document(s) may include, for example, document titles, document thumbnail images, document summaries, document activity data, document sharing data, and so on. The relevant additional document(s) may be presented as recommendations for the user. In some embodiments, the presented metadata may include data about other users, e.g., other users in one or more groups to which the user belongs. For example, the the presented metadata may include the owner of the document, the user who most frequently modified the document, the user who most frequently accessed the document, and other activity-related metadata.

As shown in 1070, the method may determine whether to import any of the relevant additional documents. In some embodiments, the user may determine to import one or more of the documents, e.g., by selecting the document(s) in the personalized user interface and/or interacting with an "import," "copy," or "move" user interface element such as a menu item or a button. In some embodiments, the content sharing system itself may determine to import one or more of the documents. If none of the relevant additional document(s) are to be imported, then the method may end. If any of the relevant additional document(s) are to be imported, then the method may proceed with the operation shown in 1020 or the operation shown in 1030.

Illustrative Computer System

In at least some embodiments, a computer system that implements a portion or all of one or more of the technologies described herein may include a computer system that includes or is configured to access one or more computer-readable media. FIG. 11 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 11 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
  a content sharing system comprising one or more processors and one or more memories to store computer-executable instructions that, when executed, cause the one or more processors to:
    select, from a plurality of connectors associated with a plurality of data sources, a connector associated with a data source, wherein the connector associated with the data source is selected based at least in part on a storage location of a document, wherein the document is stored at the location by the data source, and wherein the document is indicated by input from a user;

retrieve the document from the data source using the connector associated with the data source, wherein the document is retrieved by the connector using one or more credentials associated with the user;

provide, to the user via a user interface, access to the document;

retrieve metadata associated with a plurality of additional documents stored by the data source, wherein the metadata associated with the plurality of additional documents is retrieved using the one or more credentials used to retrieve the document and associated with the user;

determine, based at least in part on the metadata associated with the plurality of additional documents, one or more of the additional documents that are anticipated to be relevant to the user based at least on part on one or more corresponding relevance scores; and present, to the user via the user interface, data descriptive of the one or more of the additional documents that are anticipated to be relevant to the user.

2. The system as recited in claim 1, wherein the one or more of the additional documents are determined using one or more machine learning models based at least in part on activity data for individual ones of the plurality of additional documents.

3. The system as recited in claim 1, wherein the one or more of the additional documents are determined using one or more machine learning models based at least in part on schedule data for the user and one or more additional users.

4. The system as recited in claim 1, wherein the one or more of the additional documents are determined using one or more machine learning models based at least in part on sharing data for the user and one or more additional users.

5. A method, comprising:

retrieving, by a content sharing system, a document from a data source using a connector associated with the data source, wherein the document is retrieved by the connector using one or more credentials associated with a user;

retrieving, by the content sharing system, metadata associated with a plurality of additional documents stored by the data source, wherein the metadata associated with the plurality of additional documents is retrieved using the one or more credentials used to retrieve the document and associated with the user;

determining, by the content sharing system based at least in part on the metadata associated with the plurality of additional documents, one or more of the additional documents that are anticipated to be relevant to the user; and presenting, to the user via a user interface, data descriptive of the one or more of the additional documents.

6. The method as recited in claim 5, wherein retrieving the document comprises copying the document, and wherein the method further comprises:

modifying a local copy of the document based at least in part on input from one or more users; and synchronizing, by the content sharing system, the local copy of the document with a copy of the document stored by the data source.

7. The method as recited in claim 5, wherein retrieving the document comprises moving the document, and wherein the method further comprises:

determining, by the content sharing system, respective relevance scores for at least some of the plurality of additional documents, wherein the one or more of the additional documents are selected based at least in part on the respective relevance scores.

8. The method as recited in claim 5, further comprising:

receiving, by the content sharing system, user input representing a selection of individual ones of the additional documents;

retrieving, by the content sharing system, the individual ones of the additional documents from the data source using the connector associated with the data source, wherein the individual ones of the additional documents are retrieved using the one or more credentials associated with the user; and providing, by the content sharing system to the user, access to the individual ones of the additional documents.

9. The method as recited in claim 8, further comprising:

sharing, by the content sharing system based at least in part on one or more document permissions, the individual ones of the additional documents with one or more additional users in a user group.

10. The method as recited in claim 5, wherein the one or more of the additional documents are determined using one or more machine learning models based at least in part on activity data for individual ones of the plurality of additional documents.

11. The method as recited in claim 5, wherein the one or more of the additional documents are determined using one or more machine learning models based at least in part on schedule data for the user and one or more additional users.

12. The method as recited in claim 5, further comprising:

selecting, by the content sharing system from a plurality of connectors associated with a plurality of data sources, the connector associated with the data source, wherein the connector associated with the data source is selected based at least in part on metadata associated with the document.

13. One or more non-transitory computer-readable storage media storing program instructions that, when executed on or across one or more processors, perform:

selecting, by a content sharing system from a plurality of connectors associated with a plurality of data sources, a connector associated with a data source, wherein the connector associated with the data source is selected based at least in part on metadata associated with a document, and wherein the document is stored by the data source;

retrieving, by the content sharing system, the document from the data source using the connector associated with the data source, wherein the document is retrieved by the connector using one or more credentials associated with a user;

retrieving, by the content sharing system, metadata associated with a plurality of additional documents stored by the data source, wherein the metadata associated with the plurality of additional documents is retrieved using the one or more credentials used to retrieve the document and associated with the user;

determining, by the content sharing system based at least in part on the metadata associated with the plurality of additional documents, one or more of the additional documents that are anticipated to be relevant to the user based at least on part on one or more corresponding relevance scores; and presenting, to the user via one or more user interfaces, data descriptive of the document and data descriptive of the one or more of the additional documents.

14. The one or more non-transitory computer-readable storage media as recited in claim 13, further comprising additional program instructions that, when executed on or across the one or more processors, perform:
- modifying, by the content sharing system, a local copy of the document based at least in part on input from one or more users; and
- synchronizing, by the content sharing system, the local copy of the document with a copy of the document stored by the data source.

15. The one or more non-transitory computer-readable storage media as recited in claim 13, further comprising additional program instructions that, when executed on or across the one or more processors, perform:
- modifying, by the content sharing system, a local copy of the document based at least in part on input from one or more users, wherein the local copy of the document is not synchronized with the data source.

16. The one or more non-transitory computer-readable storage media as recited in claim 13, further comprising additional program instructions that, when executed on or across the one or more processors, perform:
- receiving, by the content sharing system, user input representing a selection of individual ones of the additional documents;
- retrieving, by the content sharing system, the individual ones of the additional documents from the data source using the connector associated with the data source, wherein the individual ones of the additional documents are retrieved using the one or more credentials associated with the user; and
- providing, by the content sharing system to the user, access to the individual ones of the additional documents.

17. The one or more non-transitory computer-readable storage media as recited in claim 13, further comprising additional program instructions that, when executed on or across the one or more processors, perform:
- determining, by the content sharing system based at least in part on one or more machine learning models, a request for additional metadata; and
- retrieving, by the content sharing system, the additional metadata stored by the data source, wherein the additional metadata is retrieved using the one or more credentials associated with the user, and wherein the one or more of the additional documents are determined based at least in part on the additional metadata.

18. The one or more non-transitory computer-readable storage media as recited in claim 13, wherein the one or more of the additional documents are determined using one or more automated reasoning models based at least in part on activity data for individual ones of the plurality of additional documents.

19. The one or more non-transitory computer-readable storage media as recited in claim 13, wherein the one or more of the additional documents are determined using one or more automated reasoning models based at least in part on schedule data for the user and one or more additional users.

20. The one or more non-transitory computer-readable storage media as recited in claim 13, wherein the one or more of the additional documents are determined using one or more automated reasoning models based at least in part on sharing data for the user and one or more additional users.

* * * * *